US011871488B1

(12) United States Patent
Huang

(10) Patent No.: US 11,871,488 B1
(45) Date of Patent: Jan. 9, 2024

(54) SIX-IN-ONE DIMMING CIRCUIT

(71) Applicant: Wuxi Seastar Lighting Co., Ltd., Wuxi (CN)

(72) Inventor: Zhihui Huang, Wuxi (CN)

(73) Assignee: Wuxi Seastar Lighting Co., Ltd., Wuxi (CN)

( * ) Notice: Subject to any disclaimer, the term of this patent is extended or adjusted under 35 U.S.C. 154(b) by 0 days.

(21) Appl. No.: 18/311,909

(22) Filed: May 4, 2023

(30) Foreign Application Priority Data

Jun. 28, 2022 (CN) ........................ 202210750991.X

(51) Int. Cl.
*H05B 45/10* (2020.01)
*H05B 45/37* (2020.01)
*H05B 45/325* (2020.01)

(52) U.S. Cl.
CPC ........... *H05B 45/10* (2020.01); *H05B 45/325* (2020.01); *H05B 45/37* (2020.01)

(58) Field of Classification Search
CPC ...... H05B 45/10; H05B 45/32; H05B 45/325; H05B 45/37; H05B 47/10
See application file for complete search history.

(56) References Cited

U.S. PATENT DOCUMENTS

| | | | | |
|---|---|---|---|---|
| 11,013,081 | B1 | 5/2021 | Yang et al. | |
| 11,395,383 | B2 * | 7/2022 | Li .......................... | H05B 45/14 |
| 11,490,481 | B2 | 11/2022 | Chang et al. | |
| 2015/0382423 | A1 * | 12/2015 | Yu ........................ | H05B 45/375 315/205 |
| 2023/0123235 | A1 | 4/2023 | Gritti et al. | |

FOREIGN PATENT DOCUMENTS

| | | | |
|---|---|---|---|
| CN | 105744686 | A | 7/2016 |
| CN | 110099489 | A | 8/2019 |
| CN | 210007966 | U | 1/2020 |
| CN | 113543408 | A | 10/2021 |
| CN | 214384943 | U | 10/2021 |
| EP | 3731601 | A1 | 10/2020 |

* cited by examiner

*Primary Examiner* — Jimmy T Vu
(74) *Attorney, Agent, or Firm* — True Shepherd LLC; Andrew C. Cheng

(57) ABSTRACT

A six-in-one dimming circuit includes a main control power circuit, a silicon controlled rectifier signal acquisition circuit, a DIM signal conversion circuit, a silicon controlled rectifier signal conversion circuit, and an output current control circuit. The main control power circuit comprises a live wire and a neutral wire connected to a silicon controlled rectifier dimmer or an electronic low-voltage (ELV) dimmer or a magnetic low-voltage (MLV) dimmer, and further comprises a power output positive electrode and a power output negative electrode connected to a 0-10 V dimmer or a resistance dimmer or a pulse width modulation (PWM) dimmer; and the DIM signal conversion circuit comprises a DIM signal positive input terminal and a DIM signal negative input terminal. The dimming circuit is well compatible with silicon controlled rectifier dimming, ELV dimming, MLV dimming, 0-10 V dimming, resistance dimming, and PWM dimming, to achieve six different dimming modes.

1 Claim, 48 Drawing Sheets

SIX-IN-ONE DIMMING CIRCUIT

CROSS-REFERENCE TO RELATED APPLICATIONS

This application claims priority to Chinese Patent Application No. 202210750991.X with a filing date of Jun. 28, 2022. The content of the aforementioned application, including any intervening amendments thereto, is incorporated herein by reference.

TECHNICAL FIELD

The present disclosure relates to the field of dimming circuits, and in particular, to a six-in-one dimming circuit.

BACKGROUND

At present, light-emitting diode (LED) lighting has been widely applied and is closely related to our daily life. An LED driving power supply is a core component of an LED lamp. There are various dimming modes for LED lighting with a dimmer, and it is difficult for different dimming modes to be compatible with each other. In particular, silicon controlled rectifier (SCR) dimming is extremely difficult to be compatible with other dimming modes, and a corresponding dimmer is required for users. To better meet customer needs, the present disclosure provides a six-in-one dimming circuit compatible with an SCR dimmer, an electronic low-voltage (ELV) dimmer, a magnetic low-voltage (MLV) dimmer, a 0-10 V dimmer, a resistance dimmer, and a pulse width modulation (PWM) dimmer.

SUMMARY OF PRESENT INVENTION

The objective of the present disclosure is provide a six-in-one dimming circuit to overcome the above problems existing in the prior art.

To achieve the foregoing technical objectives and technical effects, the present disclosure may be achieved through the following technical solutions:

A six-in-one dimming circuit includes a main control power circuit, a silicon controlled rectifier signal acquisition circuit, a DIM signal conversion circuit, a silicon controlled rectifier signal conversion circuit, and an output current control circuit, wherein the main control power circuit includes a live wire and a neutral wire that are connected to a silicon controlled rectifier dimmer or an electronic low-voltage (ELV) dimmer or a magnetic low-voltage (MLV) dimmer, and further includes a power output positive electrode and a power output negative electrode that are connected to a 0-10 V dimmer or a resistance dimmer or a pulse width modulation (PWM) dimmer; the DIM signal conversion circuit includes a DIM signal positive input terminal and a DIM signal negative input terminal; a signal acquisition terminal of the silicon controlled rectifier signal acquisition circuit is connected to the live wire and the neutral wire of the main control power circuit; the silicon controlled rectifier signal conversion circuit includes an input terminal separately connected to an output terminal of the silicon controlled rectifier signal acquisition circuit and an output terminal of the DIM signal conversion circuit, and includes an output terminal connected to an input terminal of the output current control circuit; and the output current control circuit includes an output terminal connected to a feedback signal input terminal of the main control power circuit, and includes a voltage signal acquisition terminal connected to the power output negative electrode of the main control power circuit.

The main control power circuit includes the live wire, the neutral wire, a rectifier bridge, a transformer, a main control chip, a first metal-oxide-semiconductor field effect transistor (MOSFET), a first diode, a first electrolytic capacitor, a first resistor, a second resistor, and a fifth resistor; the rectifier bridge includes a pin 2 connected to the live wire, a pin 3 connected to the neutral wire, and a pin 4 connected to a pin 2 of the transformer; the transformer includes a pin 1 connected to a drain of the first MOSFET and a pin 3 connected to an anode of the first diode; a pin 4 of the transformer, a negative electrode of the first electrolytic capacitor, and a first terminal of the first resistor are connected to a signal ground; a cathode of the first diode is connected to a positive electrode of the first electrolytic capacitor and the power output positive electrode, respectively; a second terminal of the first resistor is connected to the power output negative electrode; the second resistor is connected in series between a pin 7 of the main control chip and a gate of the first MOSFET; a pin 4 of the main control chip is connected to a source of the first MOSFET and a first terminal of the fifth resistor, respectively; and a pin 1 of the rectifier bridge, a pin 6 of the main control chip, and a second terminal of the fifth resistor are connected to a power supply ground.

The silicon controlled rectifier signal acquisition circuit includes a second diode, a third diode, a third MOSFET, a fourth optical coupler, a seventh capacitor, a twelfth resistor, a thirteenth resistor, a fourteenth resistor, and a twenty-third resistor; an anode of the second diode is connected to the neutral wire, and an anode of the third diode is connected to the live wire; a cathode of the second diode is connected to a cathode of the third diode and a first terminal of the thirteenth resistor, respectively; a second terminal of the thirteenth resistor, a first terminal of the twenty-third resistor, a first terminal of the seventh capacitor, and a gate of the third MOSFET are connected; a second terminal of the twenty-third resistor, a second terminal of the seventh capacitor, and a source of the third MOSFET are connected to the power supply ground; the fourth optical coupler includes a pin 1 connected to a first terminal of the twelfth resistor, a pin 3 connected to a drain of the third MOSFET, and a pin 4 connected to a first terminal of the fourteenth resistor; and a second terminal of the fourteenth resistor is connected to a pin 8 of the main control chip.

The DIM signal conversion circuit includes a digital signal conversion chip, a sixth optical coupler, a fourth capacitor, a fifth capacitor, an eighth capacitor, a ninth capacitor, a fifteenth resistor, a sixteenth resistor, an eighteenth resistor, a nineteenth resistor, a twenty-first resistor, a twenty-second resistor, and a twenty-fourth resistor; the digital signal conversion chip includes a pin 1 connected to a first terminal of the sixteenth resistor and a first terminal of the fourth capacitor, a pin 3 connected to a first terminal of the eighth capacitor, and a pin 4 connected to a pin 1 of the sixth optical coupler; a pin 5 of the digital signal conversion chip and a first terminal of the ninth capacitor are connected to the DIM signal positive input terminal; a second terminal of the ninth capacitor is connected to the DIM signal negative input terminal; the digital signal conversion chip includes a pin 6 connected to a first terminal of the twenty-second resistor, a pin 7 connected to a first terminal of the fifth capacitor, and a pin 8 connected to a first terminal of the eighteenth resistor; a second terminal of the sixteenth resistor is connected to a first terminal of the fifteenth resistor; a second terminal of the fifteenth resistor is connected to a second terminal of the eighteenth resistor and a first terminal of the nineteenth resistor, respectively; a pin 3 of the sixth optical coupler is connected to a first terminal of the twenty-fourth resistor; a second terminal of the twenty-fourth resistor is connected to the signal ground; a pin 4 of the sixth optical coupler is connected to a first terminal of the twenty-first resistor; and a pin 2 of the digital signal conversion chip, a second terminal of the fourth capacitor, a second terminal of the eighth capacitor, a pin 2 of the sixth optical coupler, a second terminal of the ninth capacitor, a second terminal of the twenty-second resistor, a second terminal of the fifth capacitor, and a second terminal of the nineteenth resistor are connected to a power ground.

The silicon controlled rectifier signal conversion circuit includes a second MOSFET, a seventeenth resistor, a twentieth resistor, a second electrolytic capacitor, and a sixth capacitor; the second MOSFET includes a drain connected to a pin 2 of the fourth optical coupler and a gate connected to the pin 3 of the sixth optical coupler; a source of the second MOSFET is connected to a first terminal of the seventeenth resistor, a first terminal of the twentieth resistor, and an anode of the second electrolytic capacitor, respectively; a second terminal of the seventeenth resistor is connected to a first terminal of the sixth capacitor; and a second terminal of the twentieth resistor, a cathode of the second electrolytic capacitor, and a second terminal of the sixth capacitor are connected to the signal ground.

The output current control circuit includes a dual operational amplifier, a third optical coupler, a third resistor, a fourth resistor, a sixth resistor, a seventh resistor, an eighth resistor, a ninth resistor, a tenth resistor, an eleventh resistor, a first capacitor, a second capacitor, and a third capacitor; the eighth resistor includes a first terminal connected to the second terminal of the seventeenth resistor and a second terminal connected to a first terminal of the ninth resistor and a first terminal of the second capacitor, respectively; a second terminal of the ninth resistor is connected to a first terminal of the first capacitor and a first terminal of the tenth resistor, respectively; a second terminal of the tenth resistor is connected to a first terminal of the eleventh resistor, a first terminal of the third capacitor, and a pin 5 of the dual operational amplifier, respectively; a first terminal of the third resistor is connected to a second terminal of the first resistor; the dual operational amplifier includes a pin 6 connected to a second terminal of the third resistor and a pin 7 connected to a pin 2 of the third optical coupler; the third optical coupler includes a pin 1 connected to a first terminal of the sixth resistor, a pin 3 connected to a first terminal of the seventh resistor and a pin 1 of the main control chip, and a pin 4 connected to a first terminal of the fourth resistor; a second terminal of the fourth resistor is connected to a pin 8 of the main control chip; a second terminal of the seventh resistor is connected to the power supply ground; a pin 8 of the dual operational amplifier is connected to a second terminal of the sixth resistor, a second terminal of the twelfth resistor, and a second terminal of the twenty-first resistor; and a pin 4 of the dual operational amplifier, a second terminal of the first capacitor, a second terminal of the second capacitor, a second terminal of the third capacitor, and a second terminal of the eleventh resistor are connected to the signal ground.

The present disclosure has the following beneficial effects: the six-in-one dimming circuit can be well compatible with silicon controlled rectifier dimming, ELV dimming, MLV dimming, 0-10 V dimming, resistance dimming, and PWM dimming, to achieve the dimming function of six different dimming modes, thereby solving the problem of difficult matching between a dimming power supply and a dimmer when a user selects different modes.

BRIEF DESCRIPTION OF THE DRAWINGS

The accompanying drawings described here are provided for further understanding of the disclosure, and constitute a part of the application. The exemplary embodiments and illustrations thereof are intended to explain the disclosure, but do not constitute inappropriate limitations to the disclosure. In the accompanying drawings.

Figure 1:
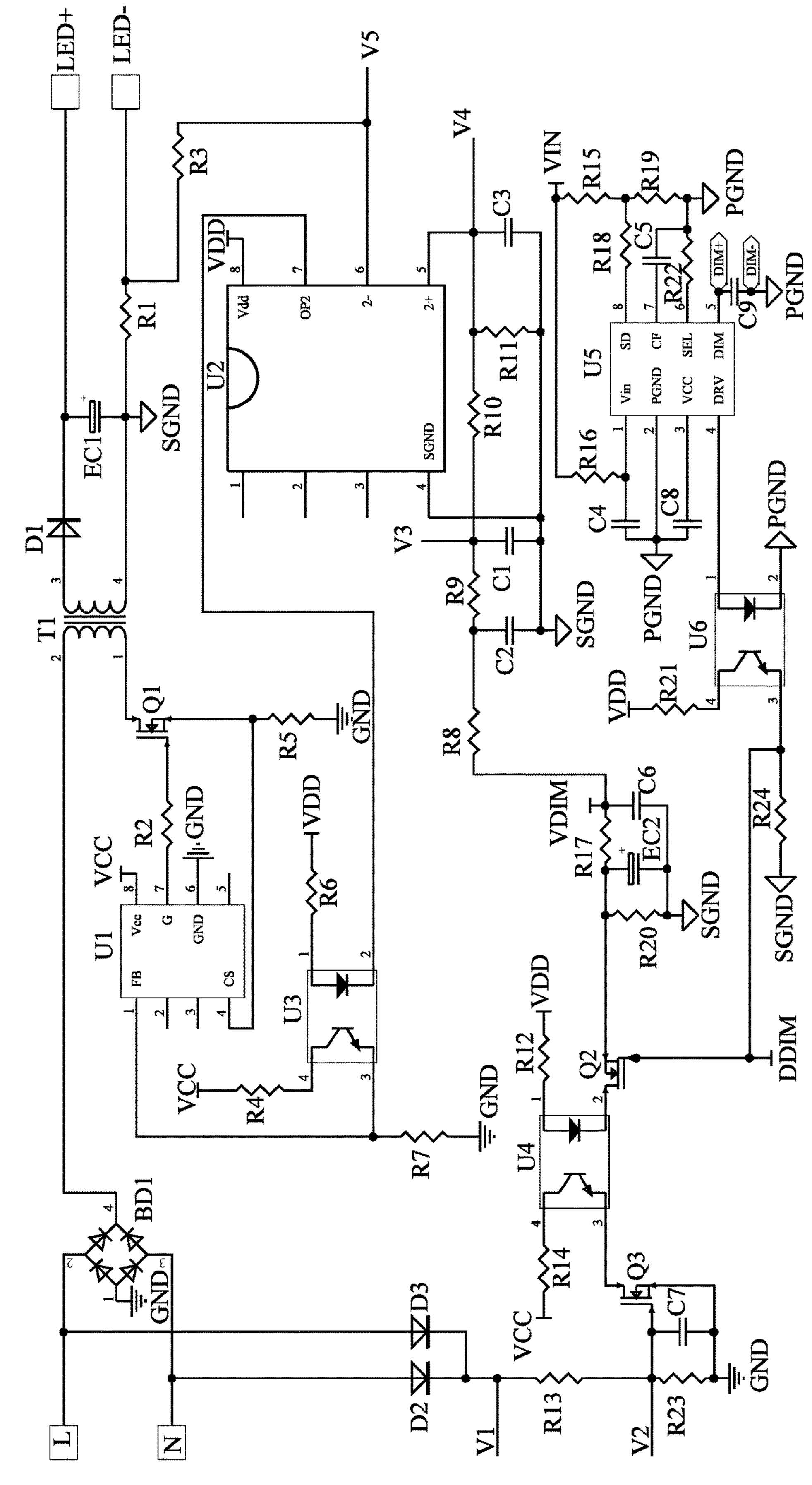
FIG. 1 is a circuit diagram of a six-in-one dimming circuit according to the present disclosure.

Reference numerals: Live wire-L, Neutral wire-N, DIM signal positive input terminal-DIM+, DIM signal negative input terminal-DIM−, Main control chip-U1, Dual operational amplifier-U2, Third optical coupler-U3, Fourth optical coupler-U4, Digital signal conversion chip-U5, Sixth optical coupler-U6, Rectifier bridge-BD1, Transformer-T1, First MOSFET-Q1, Second MOSFET-Q2, Third MOSFET-Q3, First electrolytic capacitor-EC1, Second electrolytic capacitor-EC2, First diode-D1, Second diode-D2, Third diode-D3, Power supply ground-GND, Power ground-PGND, Signal ground-SGND, First capacitor-C1, Second capacitor-C2, Third capacitor-C3, Fourth capacitor-C4, Fifth capacitor-C5, Sixth capacitor-C6, Seventh capacitor-C7, Eighth capacitor-C8, Ninth capacitor-C9, First resistor-R1, Second resistor-R2, Third resistor-R3, Fourth resistor-R4, Fifth resistor-R5, Sixth resistor-R6, Seventh resistor-R7, Eighth resistor-R8, Ninth resistor-R9, Tenth resistor-R10, Eleventh resistor-R11, Twelfth resistor-R12, Thirteenth resistor-R13, Fourteenth resistor-R14, Fifteenth resistor-R15, Sixteenth resistor-R16, Seventeenth resistor-R17, Eighteenth resistor-R18, Nineteenth resistor-R19, Twentieth resistor-R20, Twenty-first resistor-R21, Twenty-second resistor-R22, Twenty-third resistor-R23, and Twenty-fourth resistor-R24.

DETAILED DESCRIPTION OF THE EMBODIMENTS

The present disclosure will be described in detail below with reference to the accompanying drawings and the examples.

As shown in FIG. 1, a six-in-one dimming circuit includes a main control power circuit, a silicon controlled rectifier signal acquisition circuit, a DIM signal conversion circuit, a silicon controlled rectifier signal conversion circuit, and an output current control circuit. The main control power circuit includes a live wire and a neutral wire that are connected to a silicon controlled rectifier dimmer or an ELV dimmer or an MLV dimmer, and further includes a power output positive electrode and a power output negative electrode that are connected to a 0-10 V dimmer or a resistance dimmer or a PWM dimmer. The DIM signal conversion circuit includes a DIM signal positive input terminal DIM+ and a DIM signal negative input terminal DIM−. A signal acquisition terminal of the silicon controlled rectifier signal acquisition circuit is connected to the live wire and the neutral wire of the main control power circuit. The silicon controlled rectifier signal conversion circuit includes an input terminal separately connected to an output terminal of the silicon controlled rectifier signal acquisition circuit and an output terminal of the DIM signal conversion circuit, and includes an output terminal connected to an input terminal of the output current control circuit. The output current control circuit includes an output terminal connected to a feedback signal input terminal of the main control power circuit, and includes a voltage signal acquisition terminal connected to the power output negative electrode of the main control power circuit.

The main control power circuit includes the live wire L, the neutral wire N, a rectifier bridge BD1, a transformer T1, a main control chip U1, a first MOSFET Q1, a first diode D1, a first electrolytic capacitor EC1, a first resistor R1, a second resistor R2, and a fifth resistor R5. The rectifier bridge includes a pin 2 connected to the live wire, a pin 3 connected to the neutral wire, and a pin 4 connected to a pin 2 of the transformer. The transformer includes a pin 1 connected to a drain of the first MOSFET and a pin 3 connected to an anode of the first diode. A pin 4 of the transformer, a negative electrode of the first electrolytic capacitor, and a first terminal of the first resistor are connected to a signal ground. A cathode of the first diode is connected to a positive electrode of the first electrolytic capacitor and the power output positive electrode, respectively. A second terminal of the first resistor is connected to the power output negative electrode. The second resistor is connected in series between a pin 7 of the main control chip and a gate of the first MOSFET. A pin 4 of the main control chip is connected to a source of the first MOSFET and a first terminal of the fifth resistor. A pin 1 of the rectifier bridge, a pin 6 of the main control chip, and a second terminal of the fifth resistor are connected to a power supply ground GND.

The silicon controlled rectifier signal acquisition circuit includes a second diode D2, a third diode D3, a third MOSFET Q3, a fourth optical coupler U4, a seventh capacitor C7, a twelfth resistor R12, a thirteenth resistor R13, a fourteenth resistor R14, and a twenty-third resistor R23. An anode of the second diode is connected to the neutral wire, and an anode of the third diode is connected to the live wire. A cathode of the second diode is connected to a cathode of the third diode and a first terminal of the thirteenth resistor, respectively. A second terminal of the thirteenth resistor, a first terminal of the twenty-third resistor, a first terminal of the seventh capacitor, and a gate of the third MOSFET are connected. A second terminal of the twenty-third resistor, a second terminal of the seventh capacitor, and a source of the third MOSFET are connected to the power supply ground. The fourth optical coupler includes a pin 1 connected to a first terminal of the twelfth resistor, a pin 3 connected to a drain of the third MOSFET, and a pin 4 connected to a first terminal of the fourteenth resistor. A second terminal of the fourteenth resistor is connected to a pin 8 of the main control chip.

The DIM signal conversion circuit includes a digital signal conversion chip U5, a sixth optical coupler U6, a fourth capacitor C4, a fifth capacitor C5, an eighth capacitor C8, a ninth capacitor C9, a fifteenth resistor R15, a sixteenth resistor R16, an eighteenth resistor R18, a nineteenth resistor R19, a twenty-first resistor R21, a twenty-second resistor R22, and a twenty-fourth resistor R24. The digital signal conversion chip includes a pin 1 connected to a first terminal of the sixteenth resistor and a first terminal of the fourth capacitor, a pin 3 connected to a first terminal of the eighth capacitor, and a pin 4 connected to a pin 1 of the sixth optical coupler. A pin 5 of the digital signal conversion chip and a first terminal of the ninth capacitor are connected to the DIM signal positive input terminal. A second terminal of the ninth capacitor is connected to the DIM signal negative input terminal. The digital signal conversion chip includes a pin 6 connected to a first terminal of the twenty-second resistor, a pin 7 connected to a first terminal of the fifth capacitor, and a pin 8 connected to a first terminal of the eighteenth resistor. A second terminal of the sixteenth resistor is connected to a first terminal of the fifteenth resistor. A second terminal of the fifteenth resistor is connected to a second terminal of the eighteenth resistor and a first terminal of the nineteenth resistor, respectively. A pin 3 of the sixth optical coupler is connected to a first terminal of the twenty-fourth resistor. A second terminal of the twenty-fourth resistor is connected to the signal ground. A pin 4 of the sixth optical coupler is connected to a first terminal of the twenty-first resistor. A pin 2 of the digital signal conversion chip, a second terminal of the fourth capacitor, a second terminal of the eighth capacitor, a pin 2 of the sixth optical coupler, a second terminal of the ninth capacitor, a second terminal of the twenty-second resistor, a second terminal of the fifth capacitor, and a second terminal of the nineteenth resistor are connected to a power ground PGND.

The silicon controlled rectifier signal conversion circuit includes a second MOSFET Q2, a seventeenth resistor R17, a twentieth resistor R20, a second electrolytic capacitor EC2, and a sixth capacitor C6. The second MOSFET includes a drain connected to a pin 2 of the fourth optical coupler and a gate connected to the pin 3 of the sixth optical coupler. A source of the second MOSFET is connected to a first terminal of the seventeenth resistor, a first terminal of the twentieth resistor, and an anode of the second electrolytic capacitor, respectively. A second terminal of the seventeenth resistor is connected to a first terminal of the sixth capacitor. A second terminal of the twentieth resistor, a cathode of the second electrolytic capacitor, and a second terminal of the sixth capacitor are connected to the signal ground SGND.

The output current control circuit includes a dual operational amplifier U2, a third optical coupler U3, a third resistor R3, a fourth resistor R4, a sixth resistor R6, a seventh resistor R7, an eighth resistor R8, a ninth resistor R9, a tenth resistor R10, an eleventh resistor R11, a first capacitor C1, a second capacitor C2, and a third capacitor C3. The eighth resistor includes a first terminal connected to the second terminal of the seventeenth resistor and a second terminal connected to a first terminal of the ninth resistor and a first terminal of the second capacitor, respectively. A second terminal of the ninth resistor is connected to a first terminal of the first capacitor and a first terminal of the tenth resistor, respectively. A second terminal of the tenth resistor is connected to a first terminal of the eleventh resistor, a first terminal of the third capacitor, and a pin 5 of the dual operational amplifier, respectively. A first terminal of the third resistor is connected to a second terminal of the first resistor. The dual operational amplifier includes a pin 6 connected to a second terminal of the third resistor and a pin 7 connected to a pin 2 of the third optical coupler. The third optical coupler includes a pin 1 connected to a first terminal of the sixth resistor, a pin 3 connected to a first terminal of the seventh resistor and a pin 1 of the main control chip, and a pin 4 connected to a first terminal of the fourth resistor. A second terminal of the fourth resistor is connected to a pin 8 of the main control chip. A second terminal of the seventh resistor is connected to the power supply ground. A pin 8 of the dual operational amplifier is connected to a second terminal of the sixth resistor, a second terminal of the twelfth resistor, and a second terminal of the twenty-first resistor. A pin 4 of the dual operational amplifier, a second terminal of the first capacitor, a second terminal of the second capacitor, a second terminal of the third capacitor, and a second terminal of the eleventh resistor are connected to the signal ground.

Figure 2:
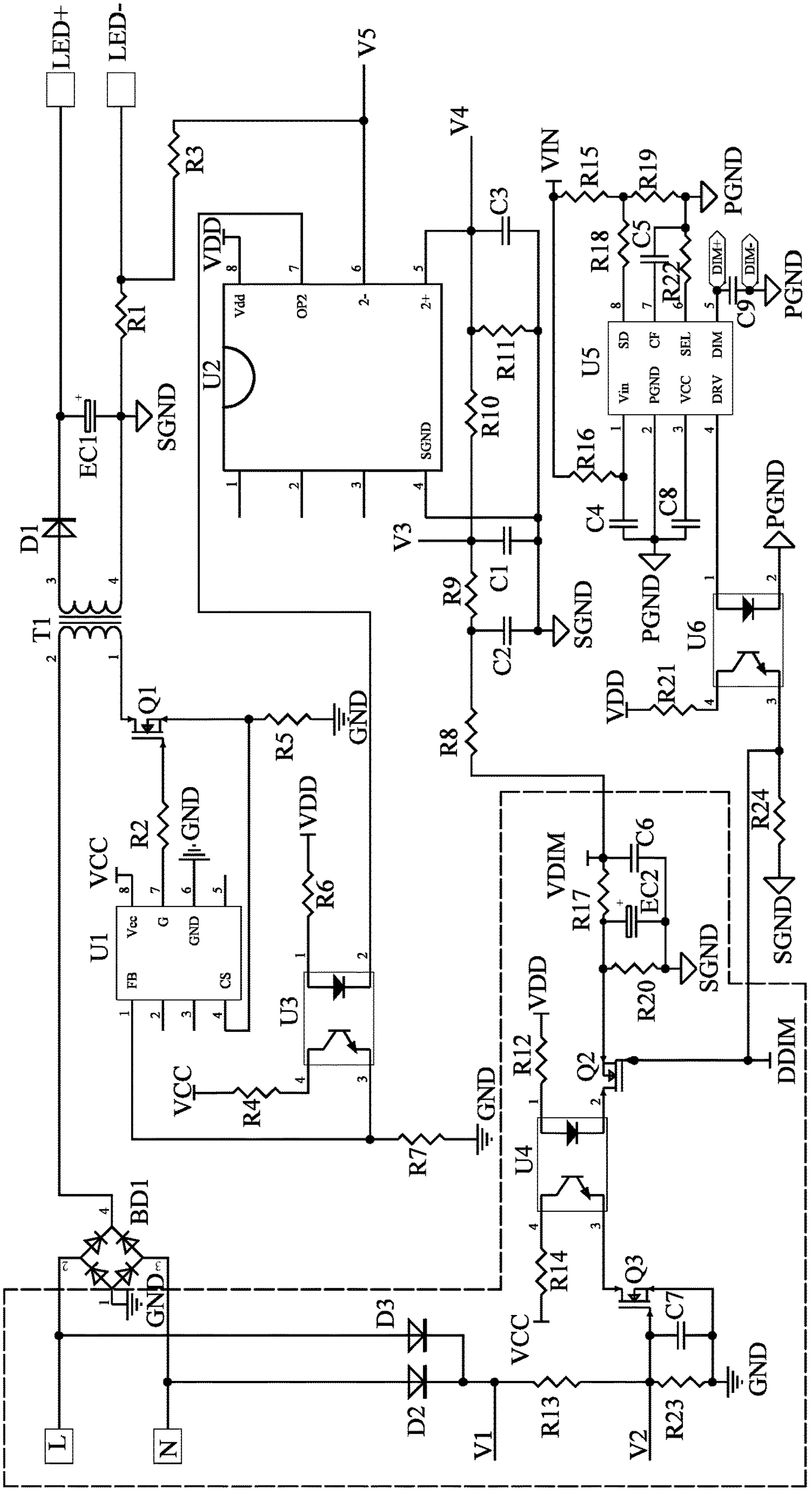
FIG. 2 is a circuit diagram for silicon controlled rectifier signal acquisition and conversion.

The principle of silicon controlled rectifier signal acquisition and conversion is described in detail as follows: the principle of silicon controlled rectifier signal acquisition and conversion is shown in a circuit part within a dotted line block diagram of FIG. 2. D2 and D3 are respectively connected to alternating current L and N wires, an alternating current signal is converted into a direct current voltage signal V1 through D2 and D3, and an input voltage is assumed as 120 Vac, 60 Hz.

Figure 3:
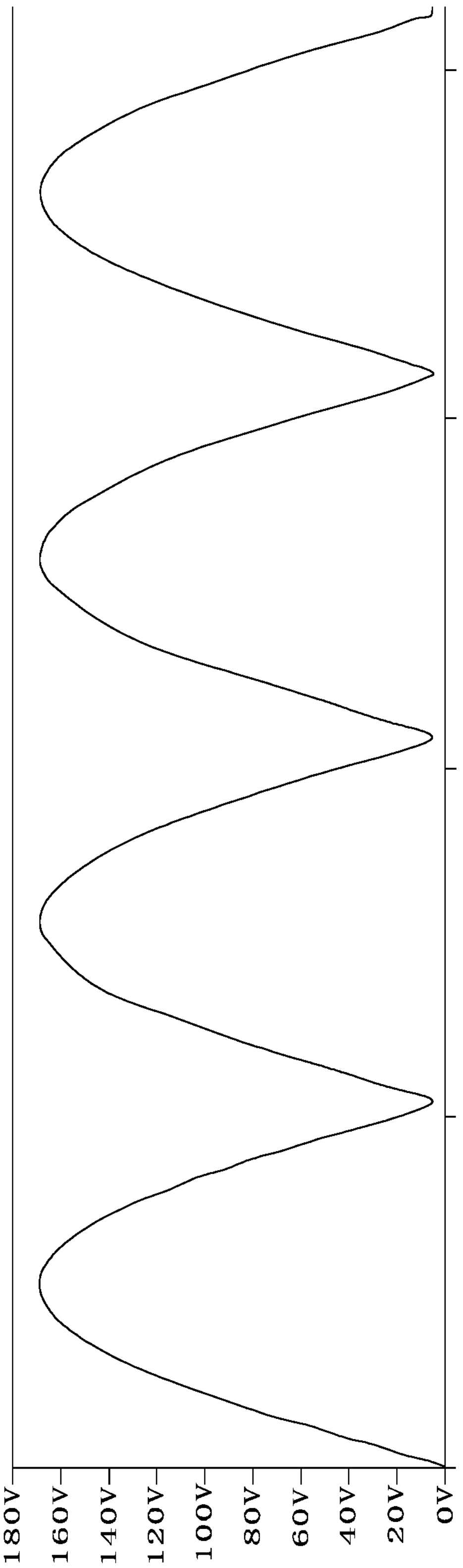
FIG. 3 is a voltage waveform diagram of V1 when a silicon controlled rectifier dimmer is adjusted to a maximum angle.
Figure 4:
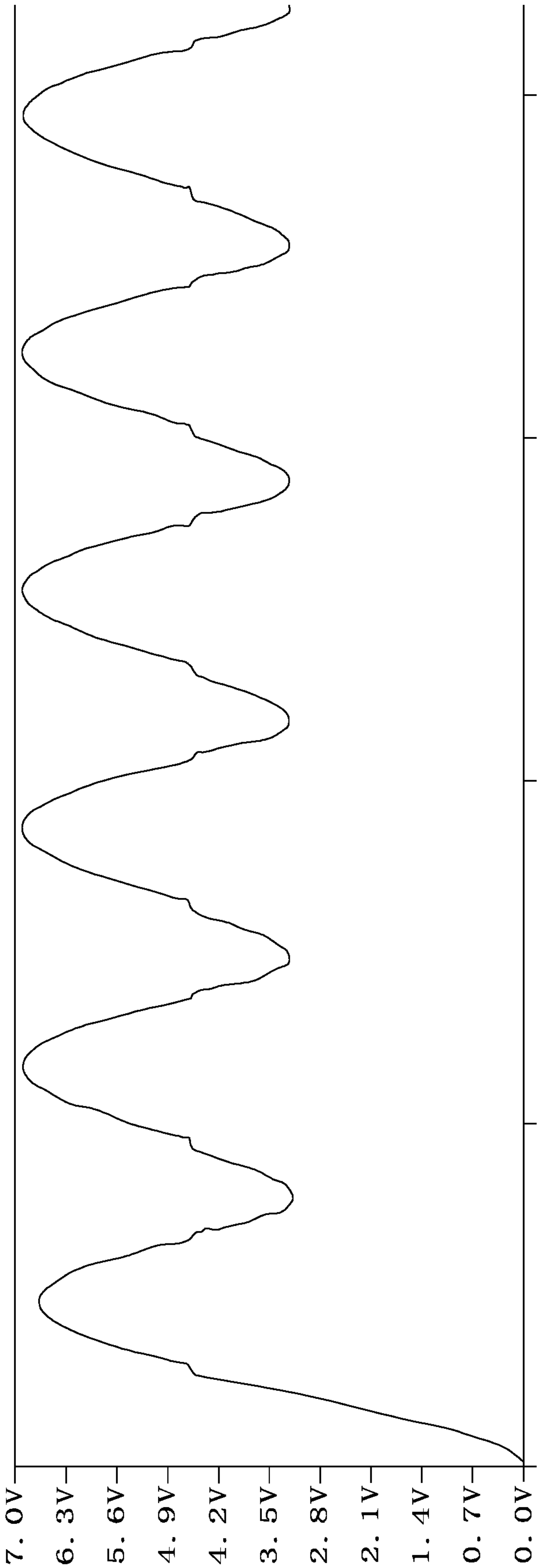
FIG. 4 is a voltage waveform diagram of V2 when a silicon controlled rectifier dimmer is adjusted to a maximum angle.
Figure 5:
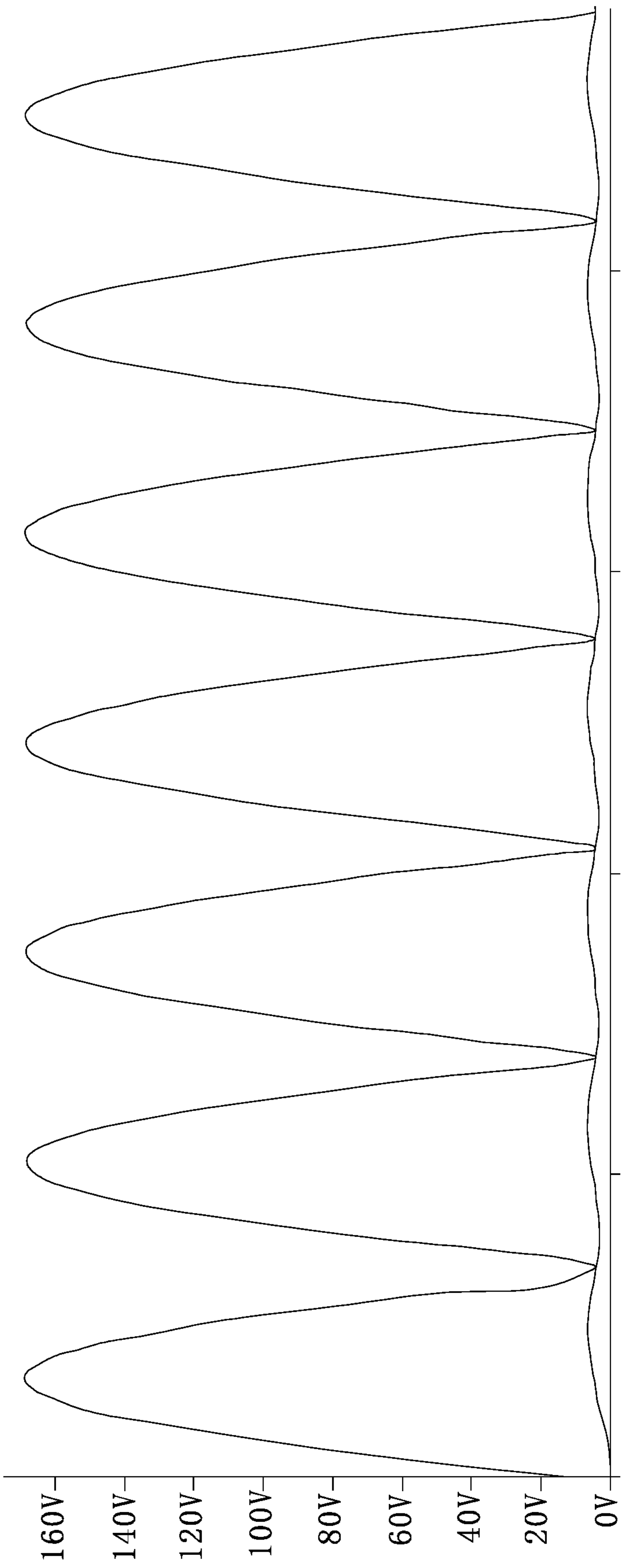
FIG. 5 is a voltage waveform comparison diagram of V1 and V2 when a silicon controlled rectifier dimmer is adjusted to a maximum angle.
Figure 6:
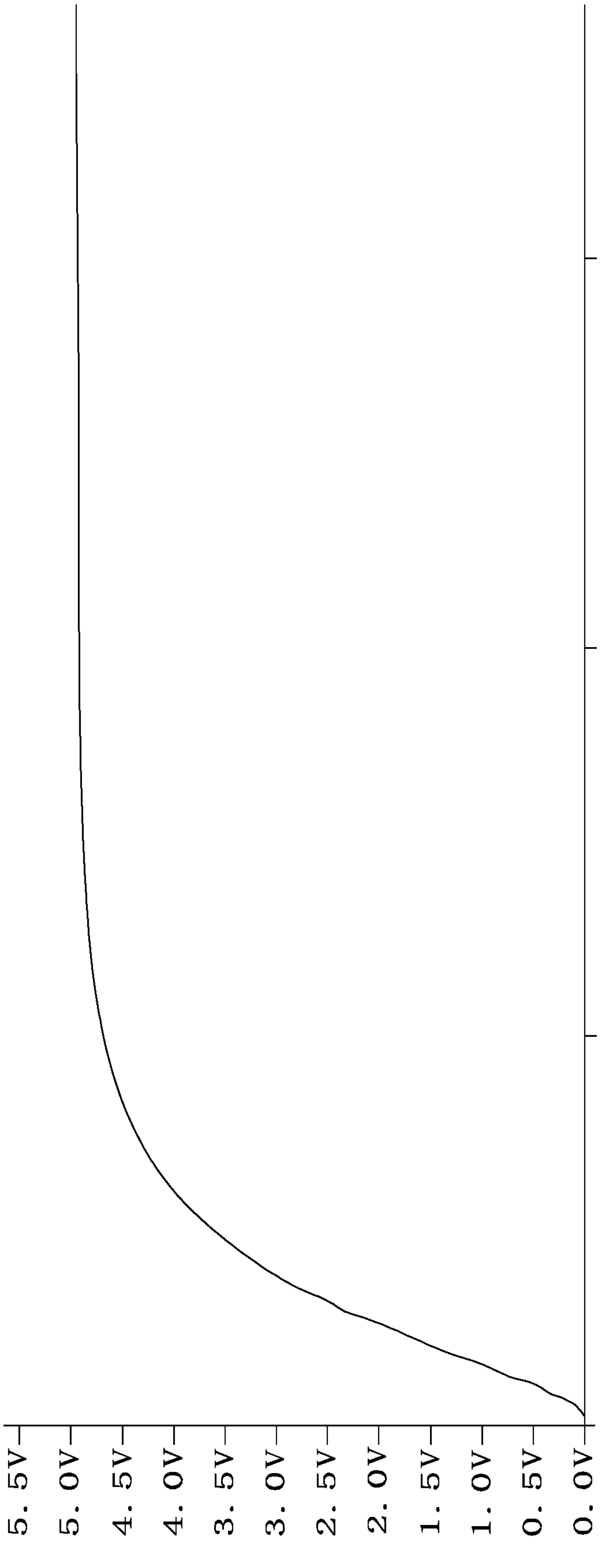
FIG. 6 is a voltage waveform diagram of VDIM when a silicon controlled rectifier dimmer is adjusted to a maximum angle.
Figure 7:
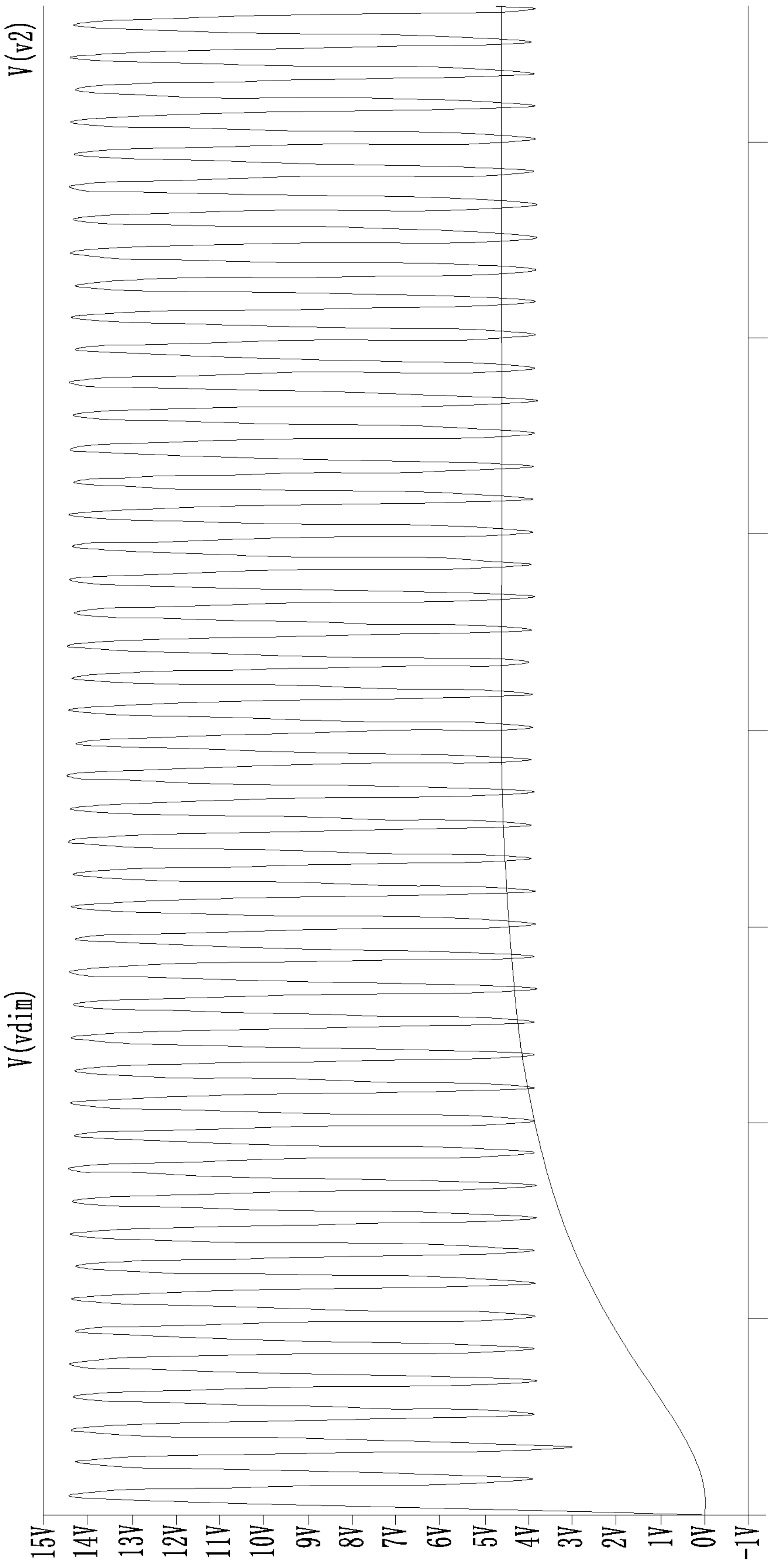
FIG. 7 is a waveform comparison diagram of V2 and VDIM when a silicon controlled rectifier dimmer is adjusted to a maximum angle.

When the silicon controlled rectifier dimmer is adjusted to the maximum angle (an angle of 100%), that is, when an input alternating current voltage is in a full phase, the voltage waveform of V1 is shown in FIG. 3. V1 is then divided by the resistors R13 and R23 to obtain a voltage V2=R23/(R23+R13), and V2 is a driving voltage of Q3. The resistance of R13 is assumed as 1 MΩ, the resistance of R23 is 51 K, and the capacitance of C7 is 10 nF. The voltage waveform of V2 is shown in FIG. 4. The model of Q3 is selected as 2N7002. According to the specification, the typical voltage Vgsth of a gate of Q3 is 2 V. At this time, V2 min=3.2 V, then V2>Vgsth, so Q3 is completely turned on within the cycle and works in a constant-current area. The comparison of the voltage waveforms of V1 and V2 at this time is shown in FIG. 5. It is set that VCC=15 V, R14=10 K, U4 is EL817, R12=5 K, R20=5 K, EC2=10 uF, R17=10 K, and C6=1 uF. A primary side of U4 is connected to a secondary side. VDD charges EC2 by the resistors R12 and R20, and EC2 is filtered by RC integration of R17 and C6 to obtain VDIM. The voltage waveform of VDIM is shown in FIG. 6, and the constant value of the voltage of VDIM is 4.9 V. The waveform comparison of V2 and VDIM is shown in FIG. 7.

Figure 8:
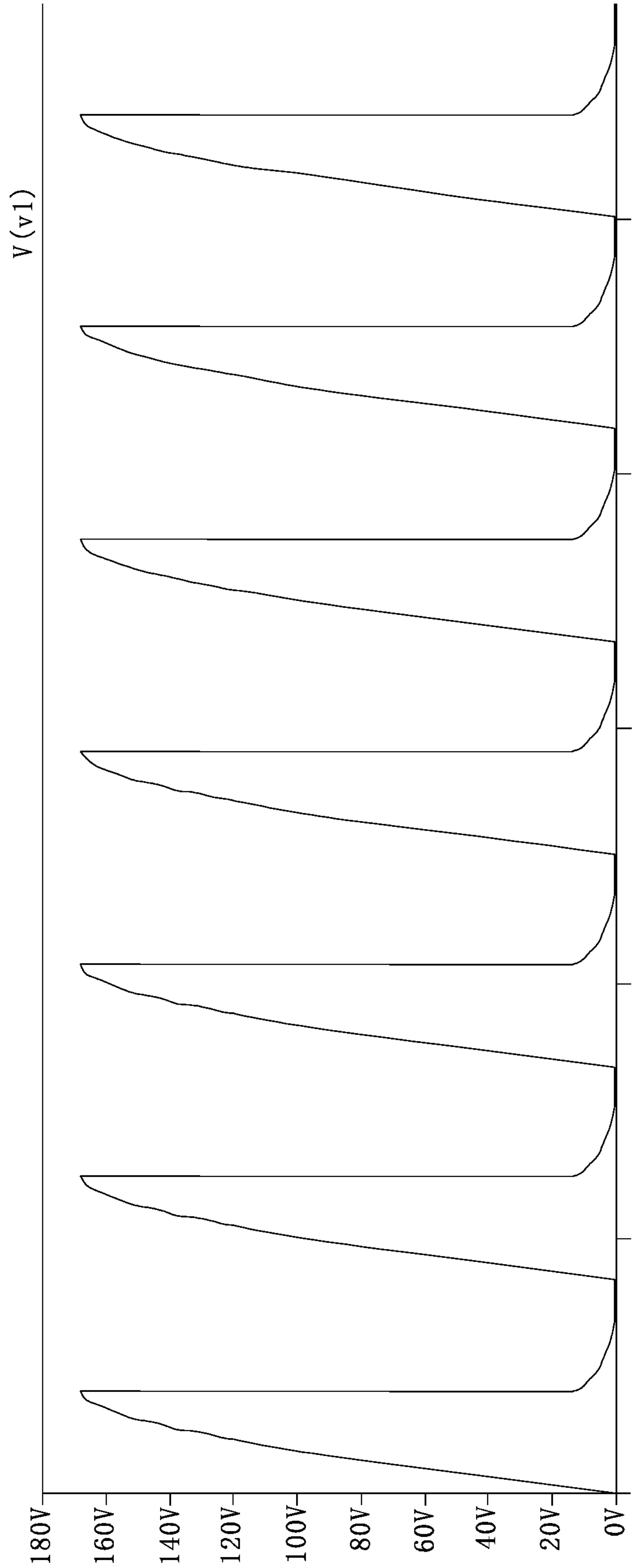
FIG. 8 is a voltage waveform diagram of V1 when a silicon controlled rectifier dimmer is adjusted to an angle of 50%.
Figure 9:
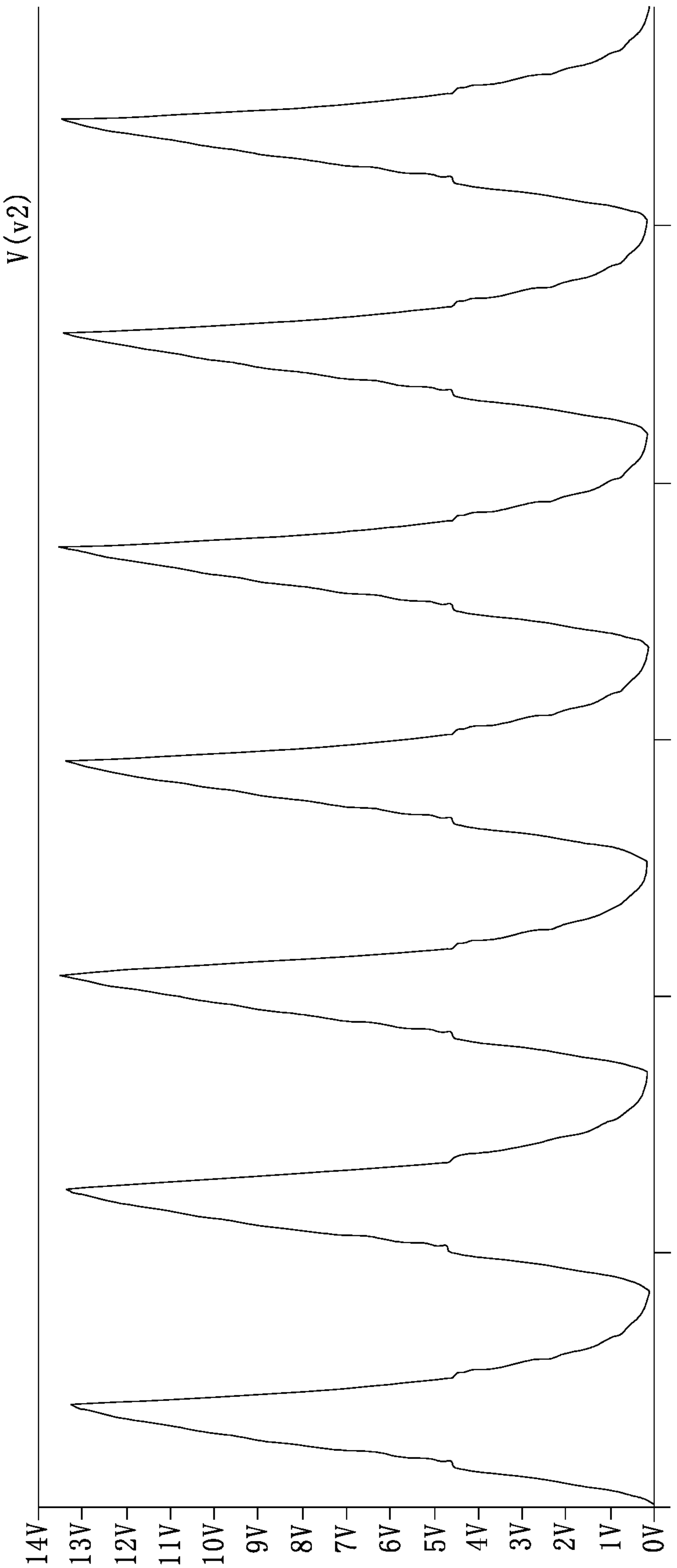
FIG. 9 is a voltage waveform diagram of V2 when a silicon controlled rectifier dimmer is adjusted to an angle of 50%.
Figure 10:
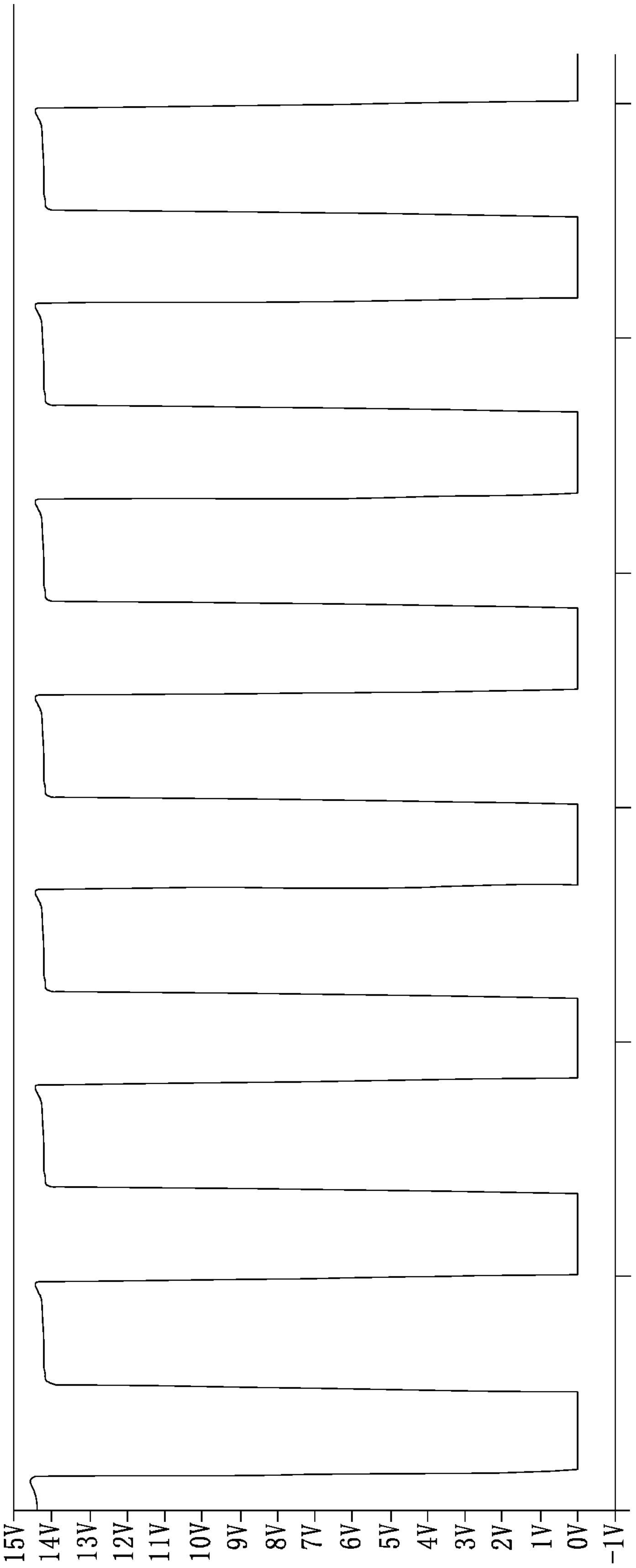
FIG. 10 is a voltage waveform diagram between a drain and a source of Q3 when a silicon controlled rectifier dimmer is adjusted to an angle of 50%.
Figure 11:
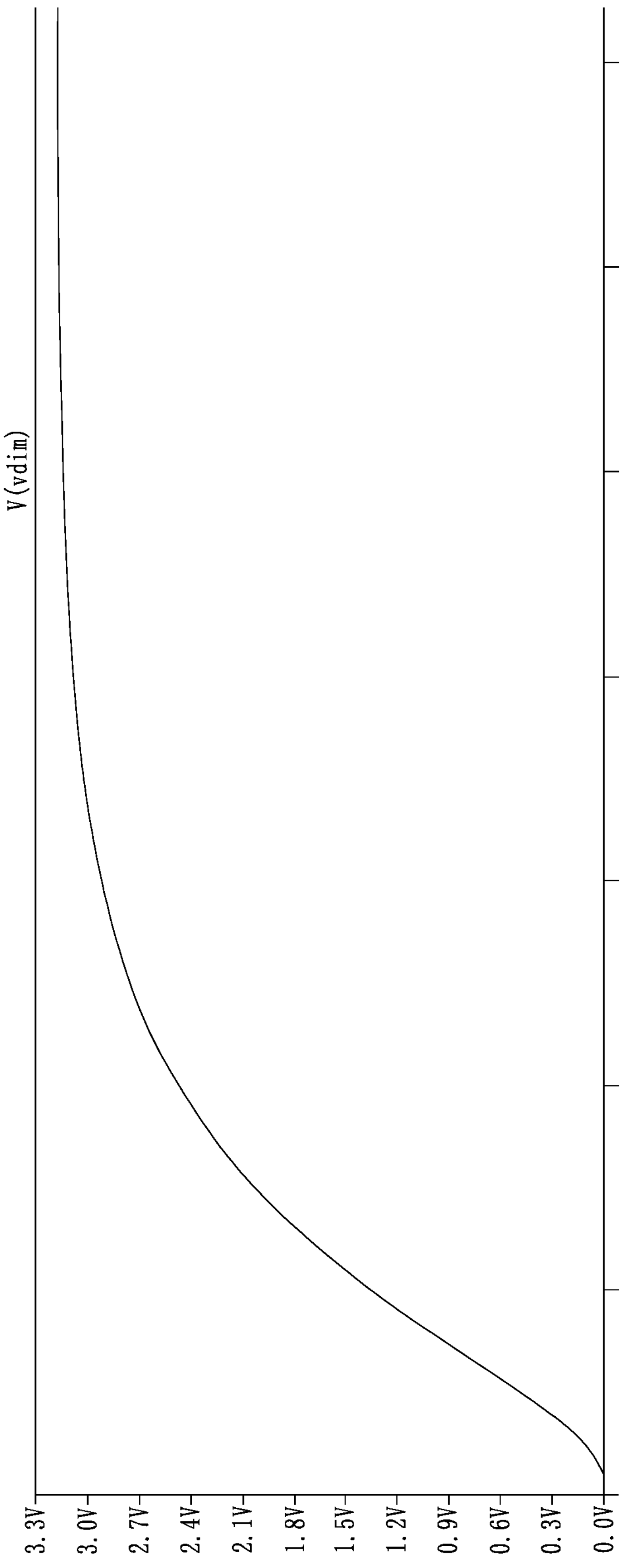
FIG. 11 is a voltage waveform diagram of VDIM when a silicon controlled rectifier dimmer is adjusted to an angle of 50%.
Figure 12:
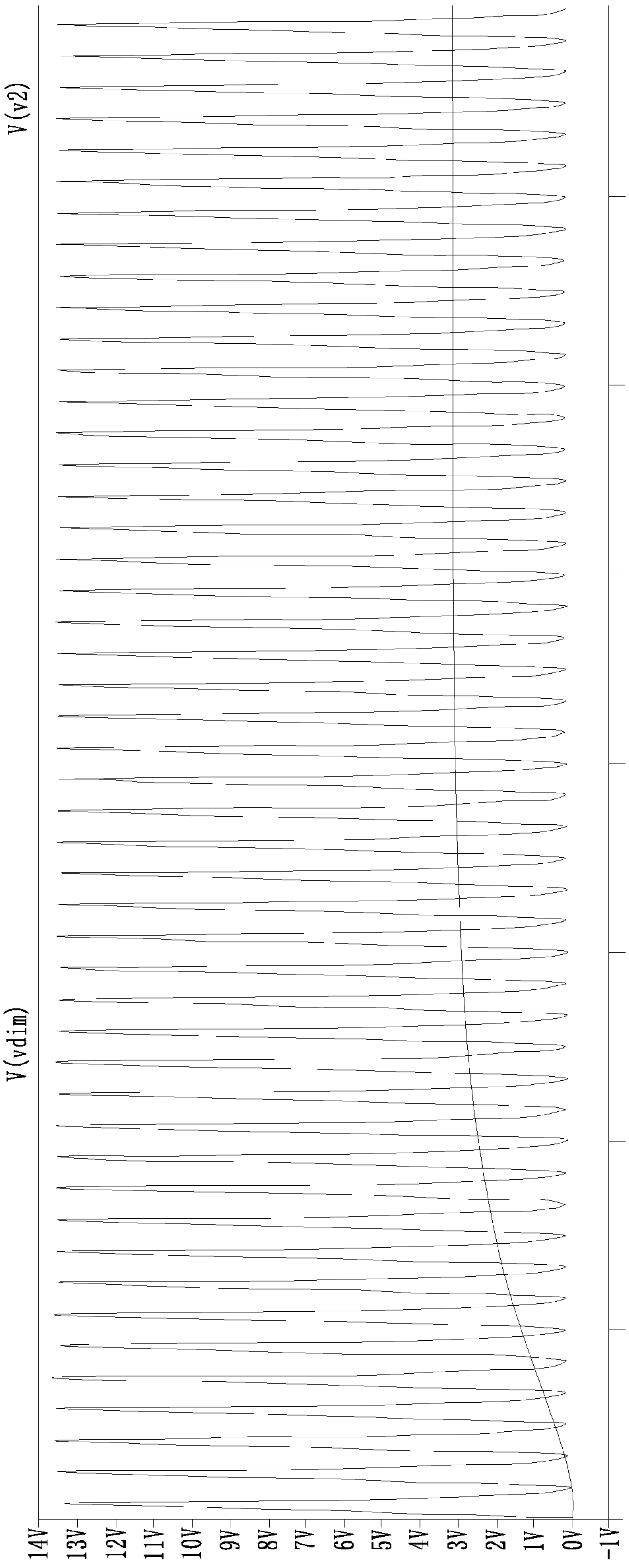
FIG. 12 is a waveform comparison diagram of V2 and VDIM when a silicon controlled rectifier dimmer is adjusted to an angle of 50%.

When the silicon controlled rectifier dimmer is adjusted to an angle of 50%, that is, when the tangent phase of the input alternating current voltage is half of the full voltage, the voltage waveform of V1 is shown in FIG. 8. V1 is then divided by the resistors R13 and R23 to obtain the voltage V2=R23/(R23+R13), and V2 is the driving voltage of Q3. The voltage waveform of V2 is shown in FIG. 9. The model of Q3 is selected as 2N7002. According to the specification, the typical voltage Vgsth of the gate of Q3 is 2 V. In view of the voltage waveform, when V2>2 V, Q3 is turned on, and when V2<2 V, Q3 is turned off. The voltage waveform between the drain and the source of Q3 at this time is shown in FIG. 10. In view of FIG. 10, within the period T, the turn-on time of Q3 is reduced to 4 ms, and T is 8.3 ms. During the turn-on time of Q3, the primary side and the secondary side of U4 are conducted, VDD charges EC2 through the resistors R12 and R20, and EC2 is filtered by RC integration of R17 and C6 to obtain VDIM. The voltage waveform of VDIM is shown in FIG. 11, and the constant value of the voltage of VDIM is 3.2 V. The waveform comparison of V2 and VDIM is shown in FIG. 12.

Figure 13:
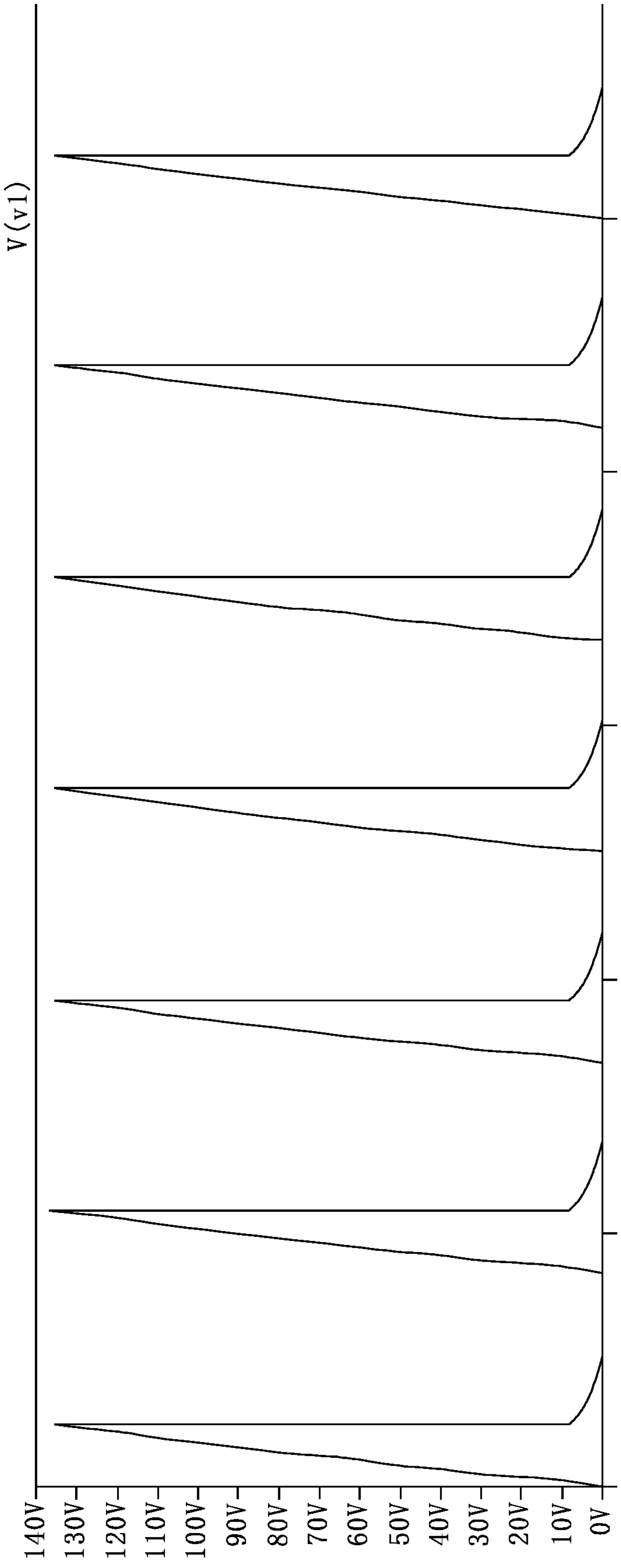
FIG. 13 is a voltage waveform diagram of V1 when a silicon controlled rectifier dimmer is adjusted to an angle of 30%.
Figure 14:
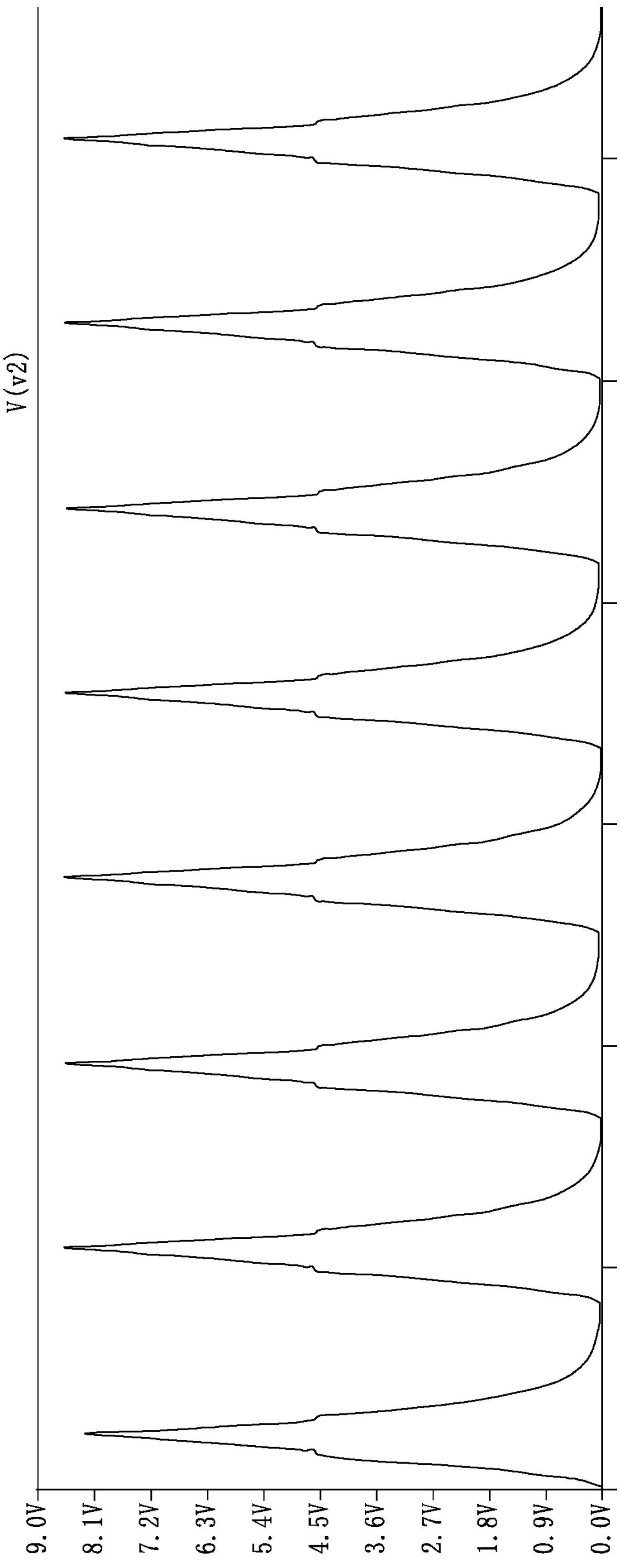
FIG. 14 is a voltage waveform diagram of V2 when a silicon controlled rectifier dimmer is adjusted to an angle of 30%.
Figure 15:
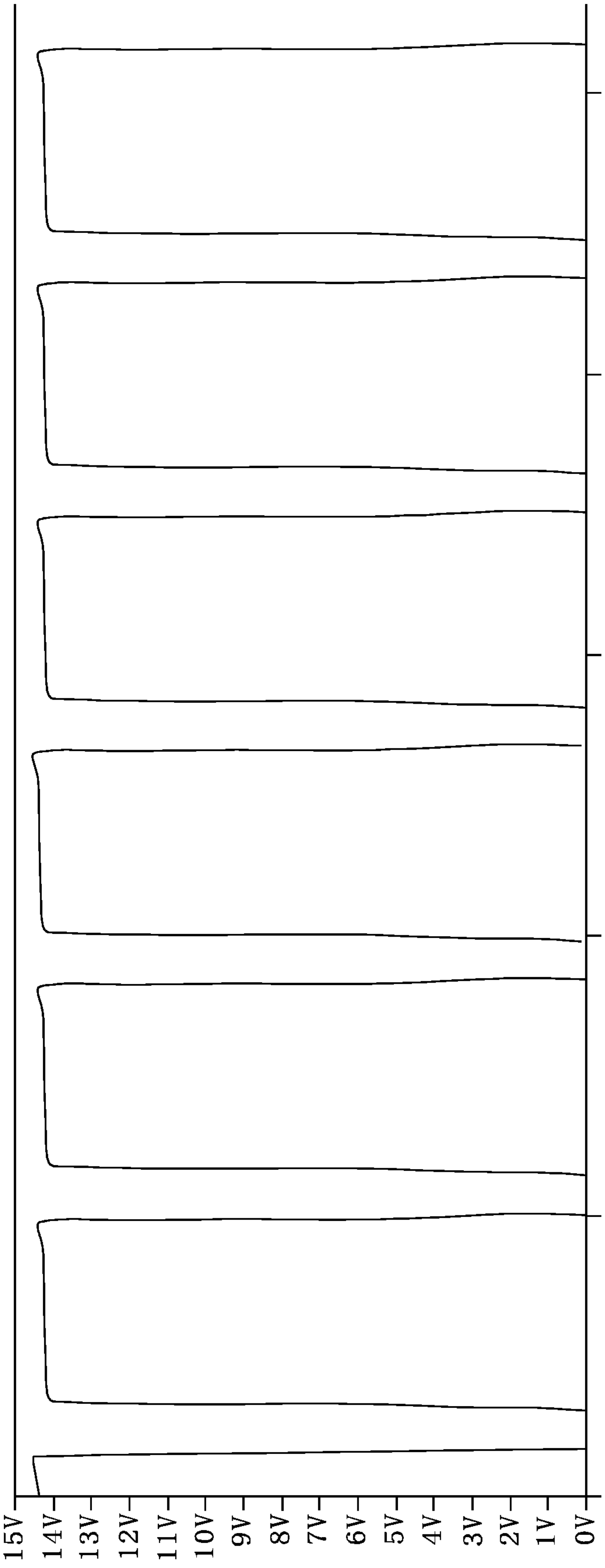
FIG. 15 is a voltage waveform diagram between a drain and a source of Q3 when a silicon controlled rectifier dimmer is adjusted to an angle of 30%.
Figure 16:
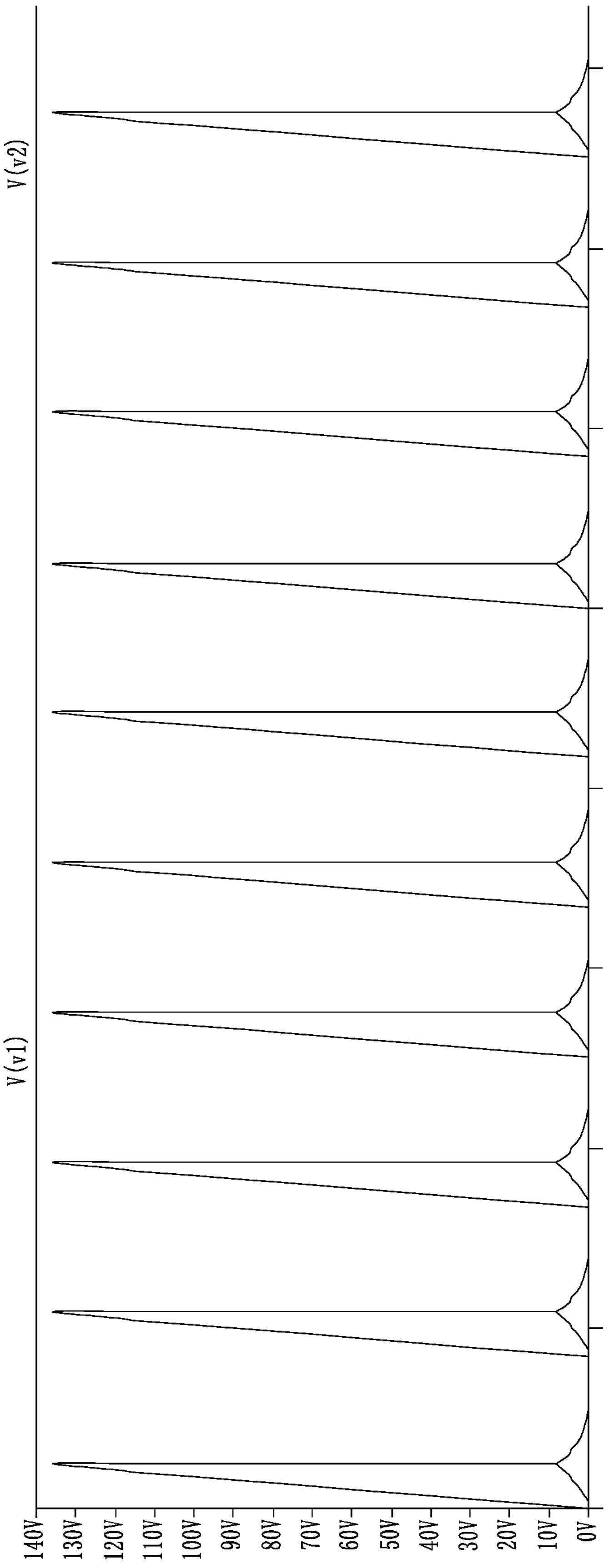
FIG. 16 is a voltage comparison waveform diagram of V1 and V2 when a silicon controlled rectifier dimmer is adjusted to an angle of 30%.
Figure 17:
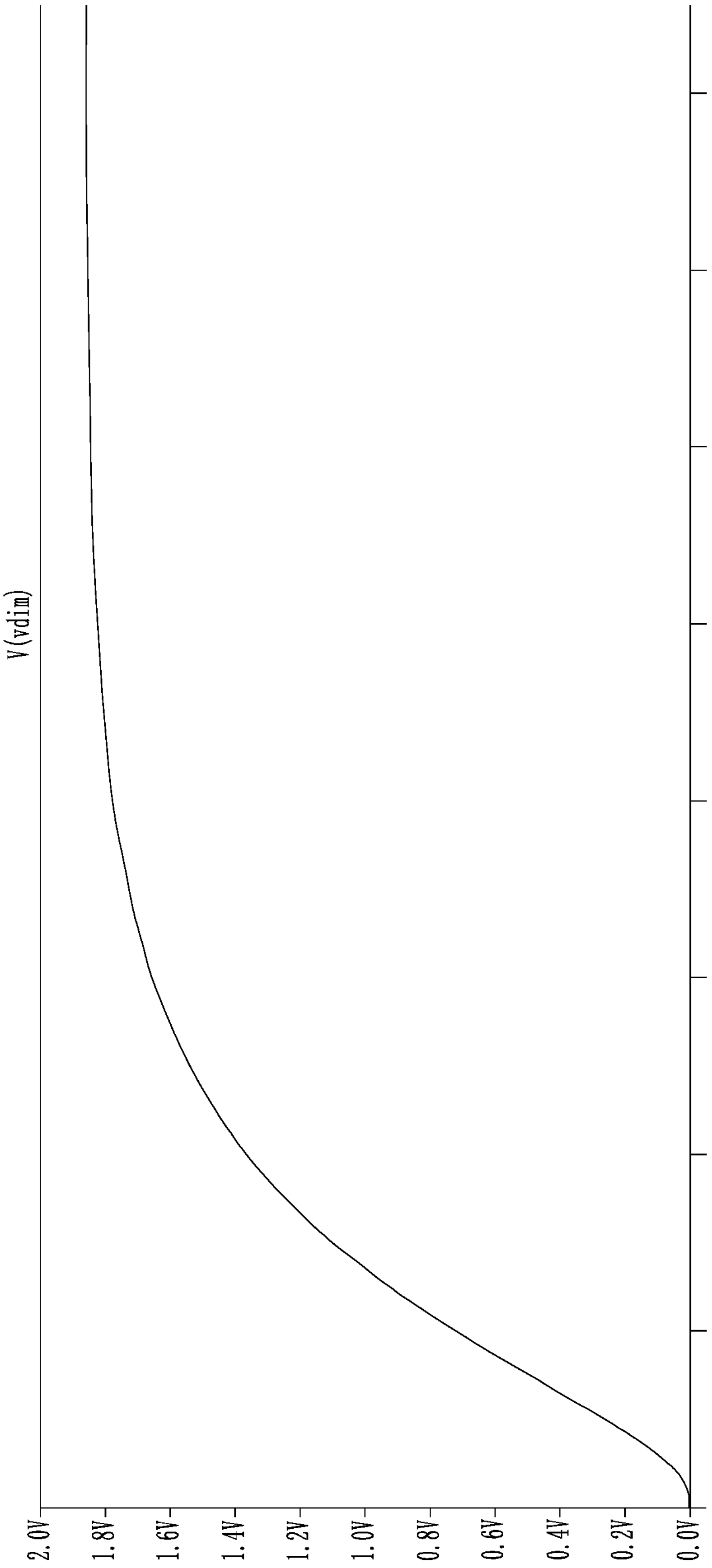
FIG. 17 is a voltage waveform diagram of VDIM when a silicon controlled rectifier dimmer is adjusted to an angle of 30%.

When the silicon controlled rectifier dimmer is adjusted to an angle of 30%, the voltage waveform of V1 is shown in FIG. 13. The voltage waveform of V2 is shown in FIG. 14. The voltage waveform between the drain and the source of Q3 is shown in FIG. 15. The voltage comparison waveform of V1 and V2 is shown in FIG. 16. The voltage waveform of VDIM is shown in FIG. 17. In view of the voltage waveform, when the silicon controlled rectifier dimmer is adjusted to an angle of 30%, the turn-on time of the MOSFET Q3 within the period T is reduced to 2.1 ms, and T=8.3 ms. The constant voltage of VDIM is 1.85 V, and the voltage of VDIM decreases as the silicon controlled rectifier turn-on angle decreases.

Figure 18:
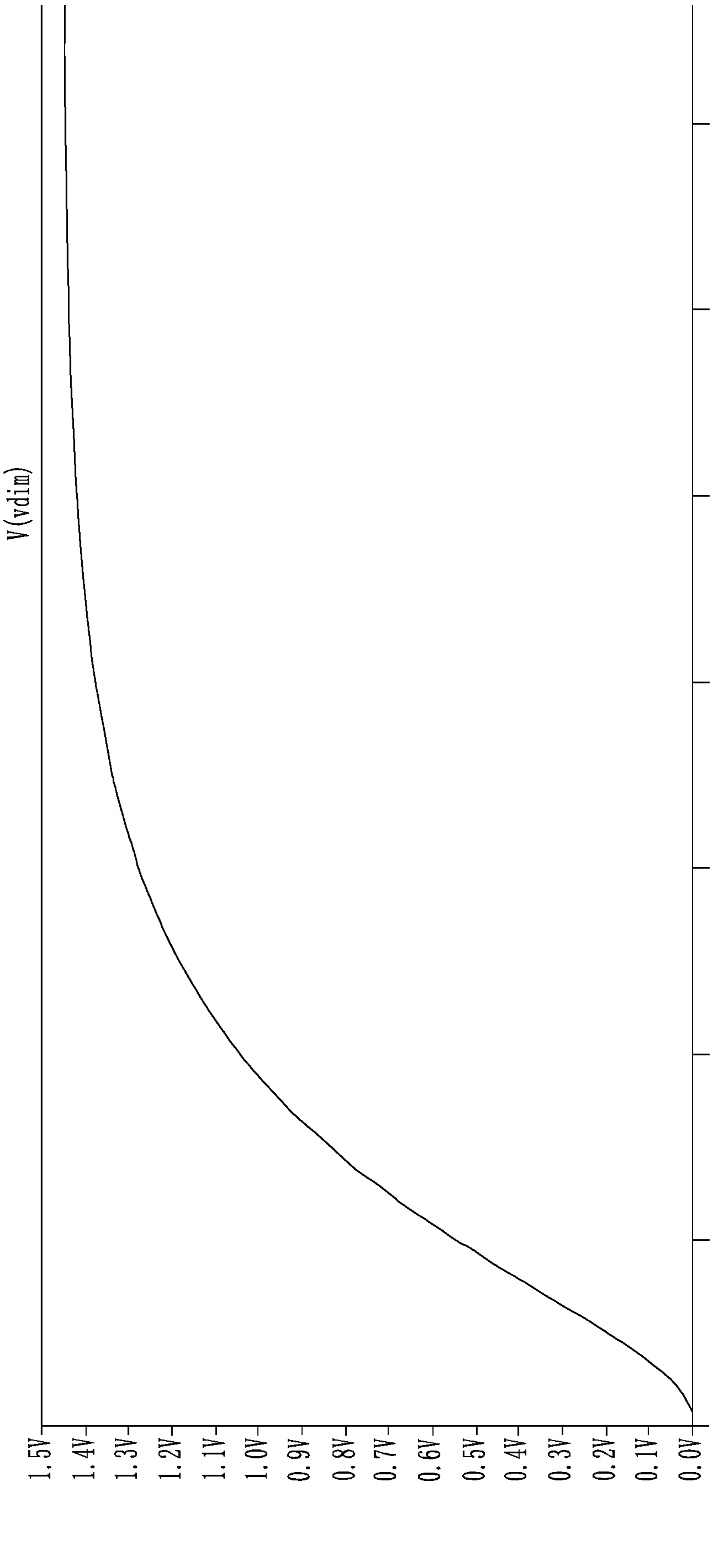
FIG. 18 is a voltage waveform diagram of VDIM when a silicon controlled rectifier dimmer is adjusted to an angle of 20%.

When the silicon controlled rectifier dimmer is adjusted to an angle of 20%, the voltage waveform of VDIM is shown in FIG. 18, and the constant voltage value of VDIM is 1.45 V.

Figure 19:
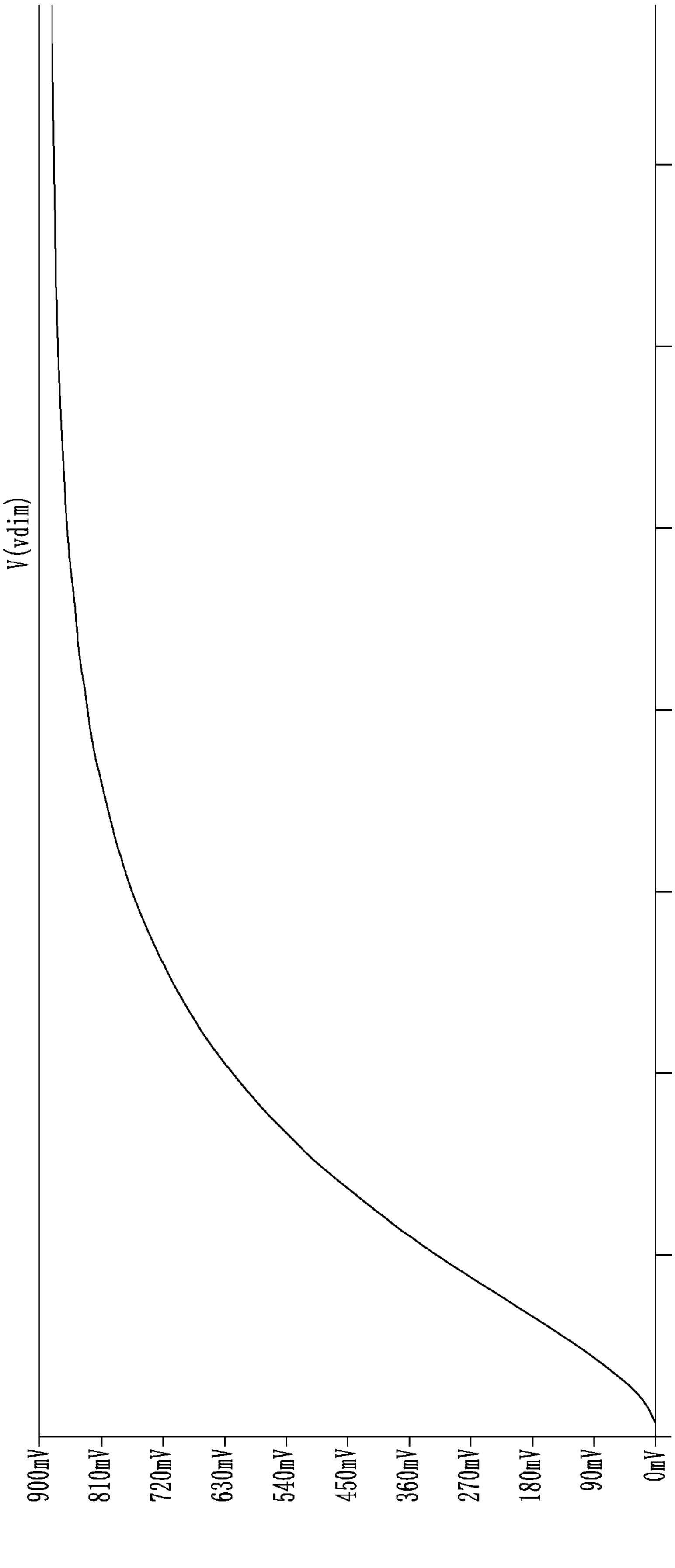
FIG. 19 is a voltage waveform diagram of VDIM when a silicon controlled rectifier dimmer is adjusted to an angle of 10%.

When the silicon controlled rectifier dimmer is adjusted to an angle of 10%, the voltage waveform of VDIM is shown in FIG. 19, and the constant voltage value of VDIM is 0.88 V.

In conclusion, the acquisition of the silicon controlled rectifier dimmer signal is converted into a VDIM analog direct current voltage signal through a circuit, and the magnitude of the VDIM voltage follows the dimming angle of the silicon controlled rectifier dimmer, which is a positive function curve relationship. The VDIM voltage is also a power supply voltage of a reference voltage of the output current control circuit. When the silicon controlled rectifier dimming signal changes, VDIM changes, and the reference voltage of the output current control circuit changes, such that the output current changes, and the function of silicon controlled rectifier dimming is achieved.

Figure 20:
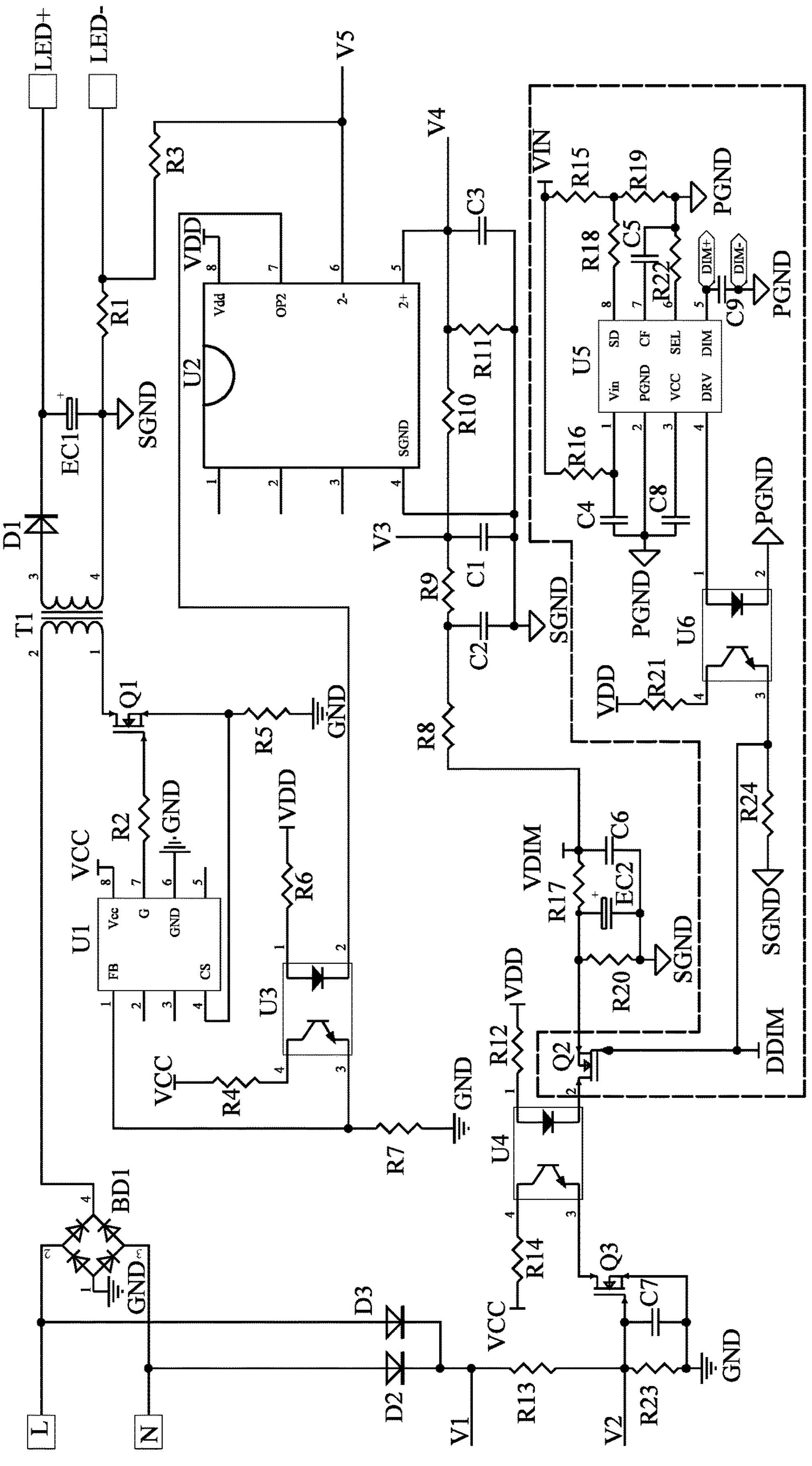
FIG. 20 is a circuit diagram of a dimming principle of a 0-10 V dimmer, a resistance dimmer, and a PWM dimmer.

The dimming principle of the 0-10 V dimmer, the resistance dimmer, and the PWM dimmer is detailed in detail as follows: the dimming principle circuit of the 0-10 V dimmer, the resistance dimmer, and the PWM dimmer is shown in a dotted line block diagram of FIG. 20. U5 is a signal conversion main control IC; VIN is a power supply voltage; R16 is a charging current limiting resistor of IC; C4 is a power supply filter capacitor of Vin; C8 is a power supply filter capacitor of VCC; and R18, R15, and R19 are VIN voltage measurement circuits, with an OVP overvoltage protection function. U5 can set the frequency of DRV pin output PWM according to the capacity of C5, and can set the curve of DRV pin output PWM according to the resistance of R22. C9 is a filter capacitor of a DIM pin. U6 has a dimming isolation function. R21 and R24 constitute a voltage divider circuit, which can adjust high level and voltage values of the PWM signal. 0-10 V dimmer, resistance dimmer and PWM dimmer signals can separately access the DIM+ and DIM− dimming input pins, and are converted into a PWM signal with a set frequency by the DIM signal conversion circuit, then the PWM signal is transmitted and converted into DDIM through U6, the DDIM signal drives Q2, and Q2 is in an on-off state. VDIM charges C2 through the switching effect of Q2, and is filtered by RC integration through R9 and C1 into a stable direct current voltage, which is divided by R10 and R11 to a pin 5 of U2. The pin 5 of U2 is the voltage reference of a CC current control value loop, and C3 is a filter capacitor. When the magnitudes of the 0-10V dimmer, resistance dimmer and PWM dimmer signals change, the duty cycle of the PWM1 signal becomes larger or smaller, PWM1 is converted into a DDIM signal through U6, VDD, R21, and R24, and at this time, the duty cycle of DDIM also increases or decreases with the dimming signal. Moreover, because DDIM controls the turn-on time of Q2, the reference voltage of the output current control circuit of the pin 5 of U2 also increases or decreases accordingly. When the reference voltage of the output current control circuit changes, the power supply output current changes with the reference voltage, thereby achieving the signal dimming function of the 0-10 V dimmer, the resistance dimmer, and the PWM dimmer.

It is set that VIN=20 V, R16=1 K, R15=3 M, R18=133 K, R19=24 K, R22=0 R, C4=2.2 uF, C8=1 uF, C9=10 nF, C5=47 nf, VDD=10 V, R21=5 K, R24=5 K, and U6=EL817. When C5=47 nF, the frequency of PWM1 is set to be 1 Khz.

Figure 21:
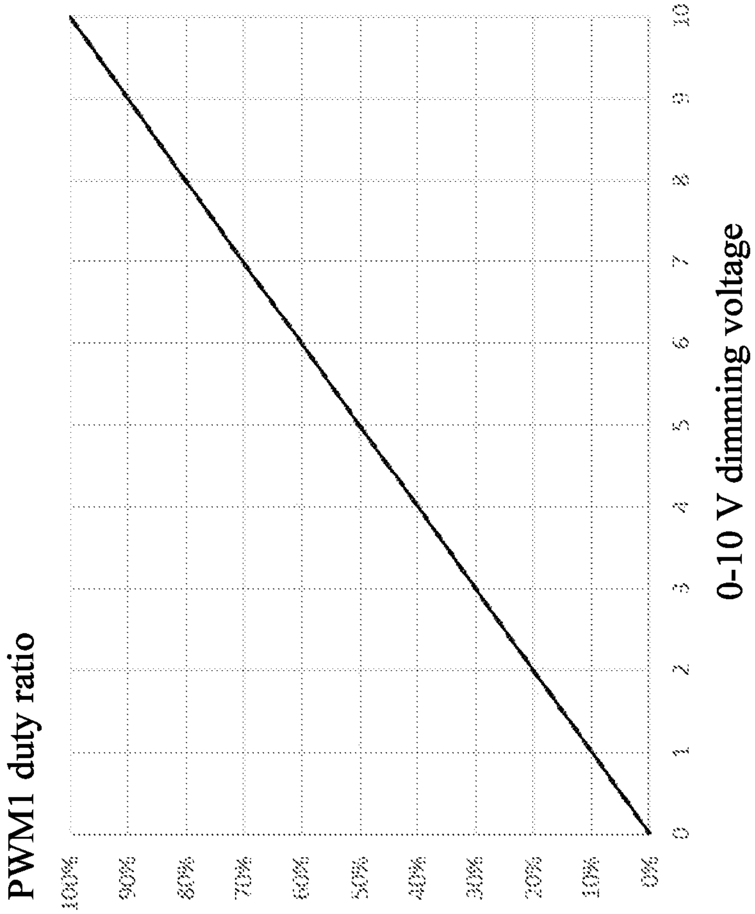
FIG. 21 is a graph of a relationship between a 0-10 V dimmer signal and PWM1.

When the 0-10 V dimmer signal accesses DIM+ and DIM−, the relationship curve between the 0-10 V dimmer signal and PWM1 is shown in FIG. 21.

Figure 22:
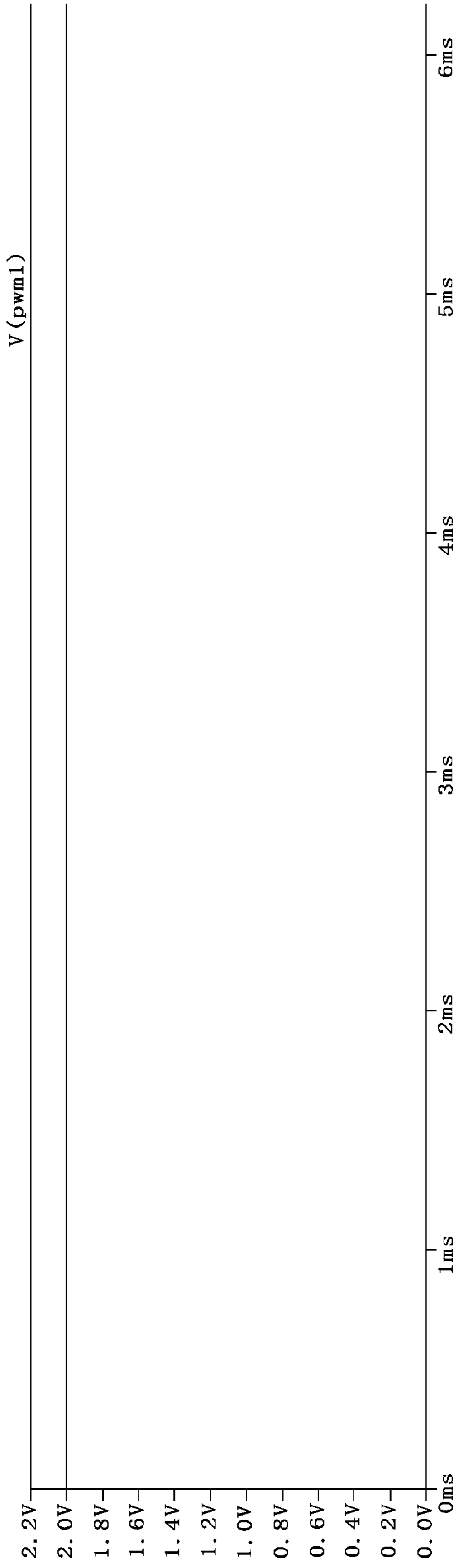
FIG. 22 is a waveform diagram of PWM1 when a voltage of a 0-10 V dimmer is 10 V.
Figure 23:
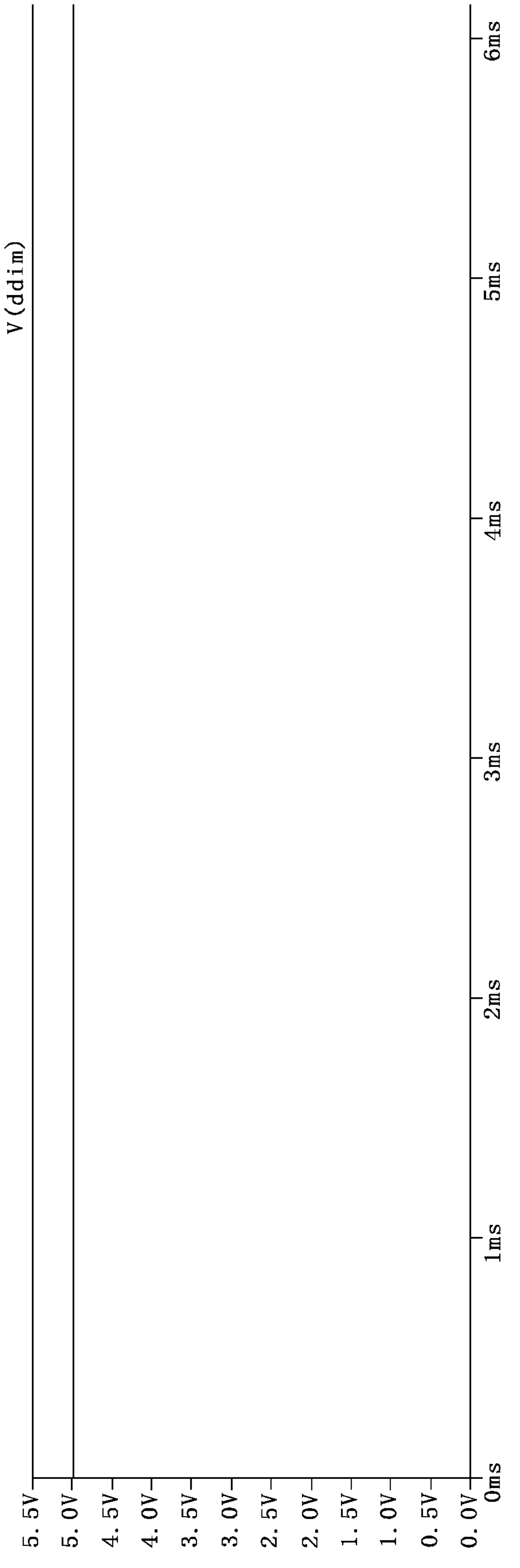
FIG. 23 is a waveform diagram of DDIM when a voltage of a 0-10 V dimmer is 10 V.
Figure 24:
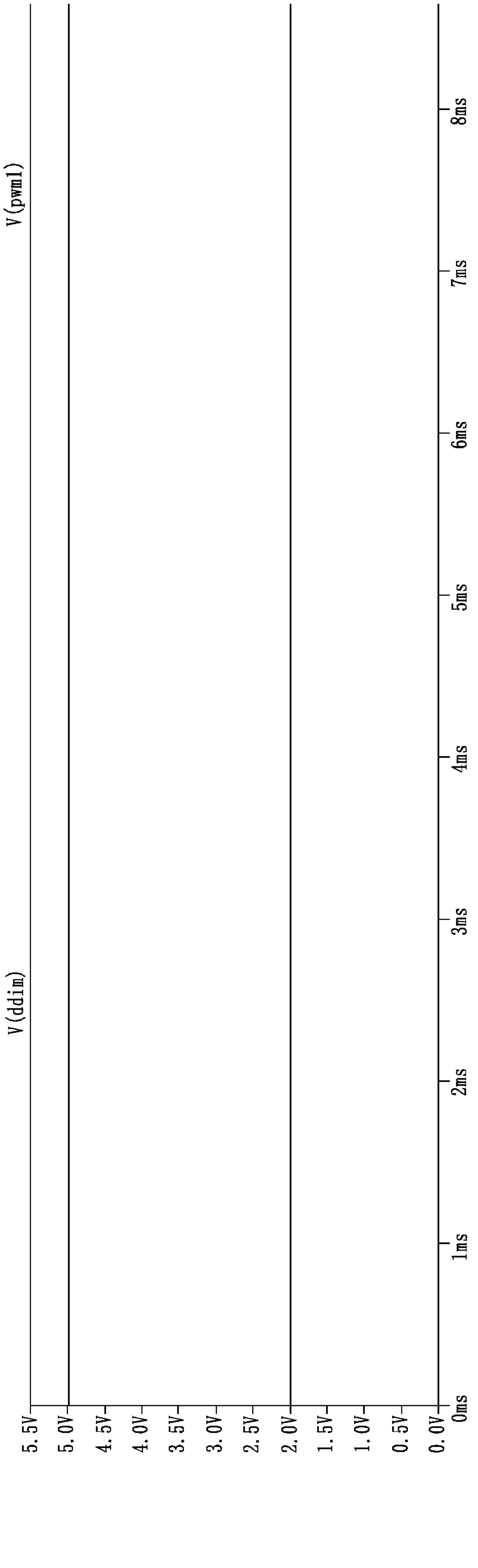
FIG. 24 is a waveform comparison diagram of PWM1 and DDIM when a voltage of a 0-10 V dimmer is 10 V.

When the voltage of the 0-10 V dimmer is 10 V, the duty cycle of PWM1 is 100%, and high level value of PWM1 is 2 V, as shown in FIG. 22. The duty cycle of DDIM is 100%, and high level value of DDIM is 5 V, as shown in FIG. 23. The waveform comparison of PWM1 and DDIM is shown in FIG. 24.

Figure 25:
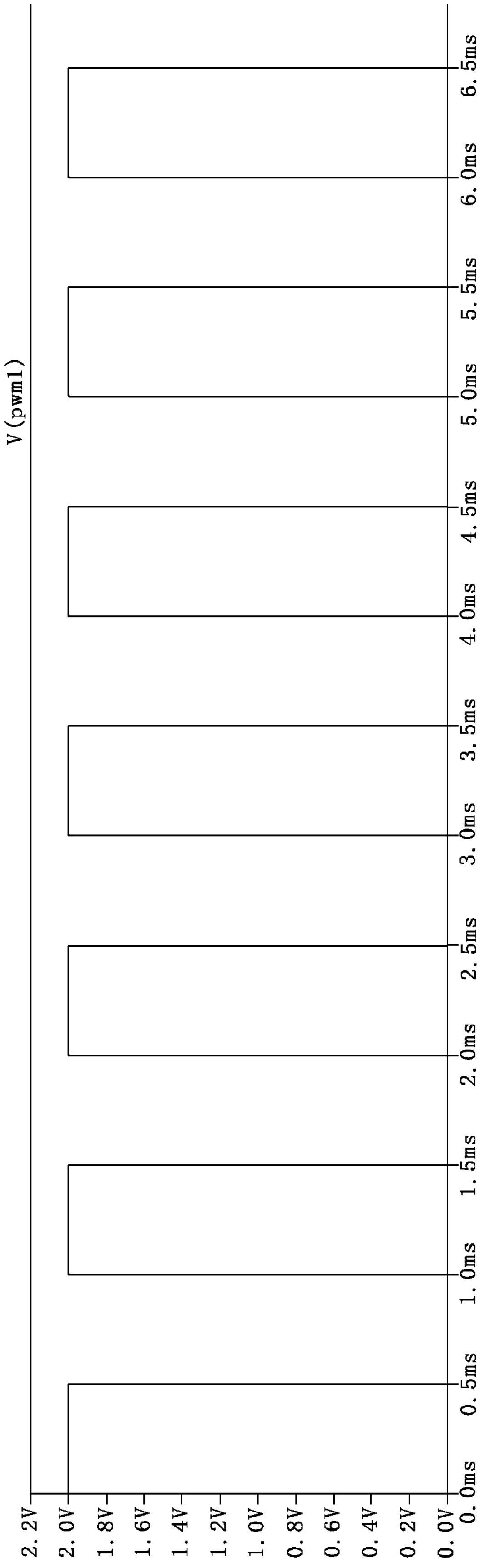
FIG. 25 is a waveform diagram of PWM1 when a voltage of a 0-10 V dimmer is 5 V.
Figure 26:
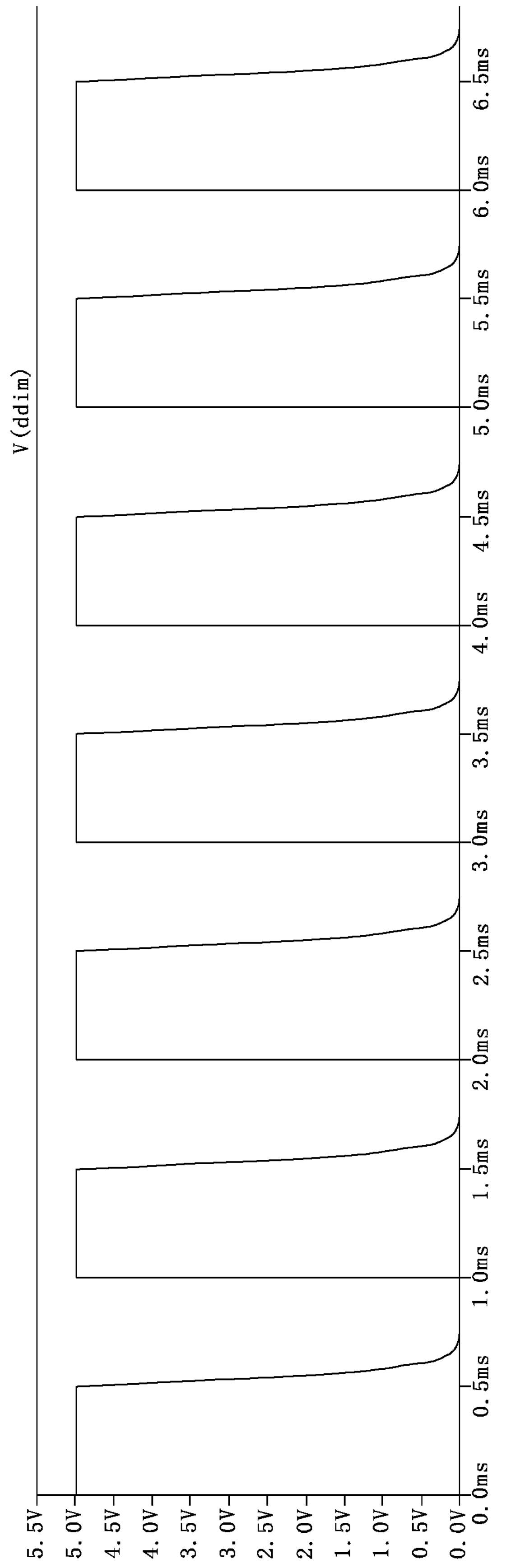
FIG. 26 is a waveform diagram of DDIM when a voltage of a 0-10 V dimmer is 5 V.
Figure 27:
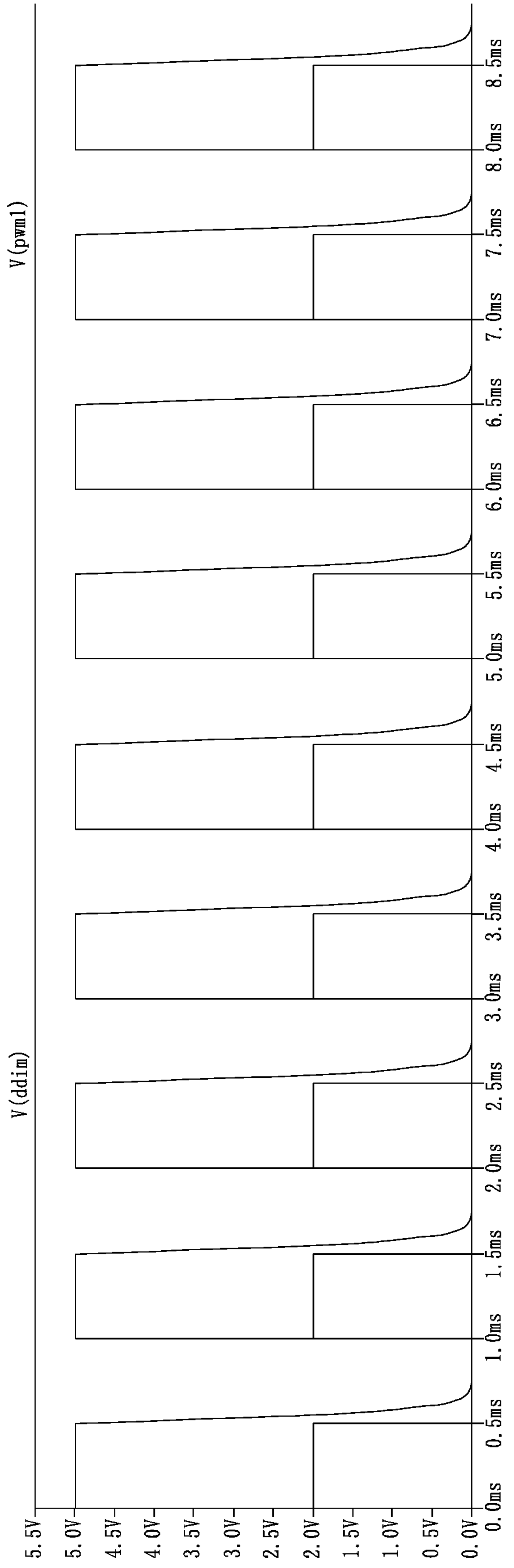
FIG. 27 is a waveform comparison diagram of PWM1 and DDIM when a voltage of a 0-10 V dimmer is 5 V.

When the voltage of the 0-10 V dimmer is 5V, the duty cycle of PWM1 is 50%, and high level value of PWM1 is 2 V, as shown in FIG. 25. The duty cycle of DDIM is 50%, and high level value of DDIM is 5 V, as shown in FIG. 26. The waveform comparison of PWM1 and DDIM is shown in FIG. 27.

Figure 28:
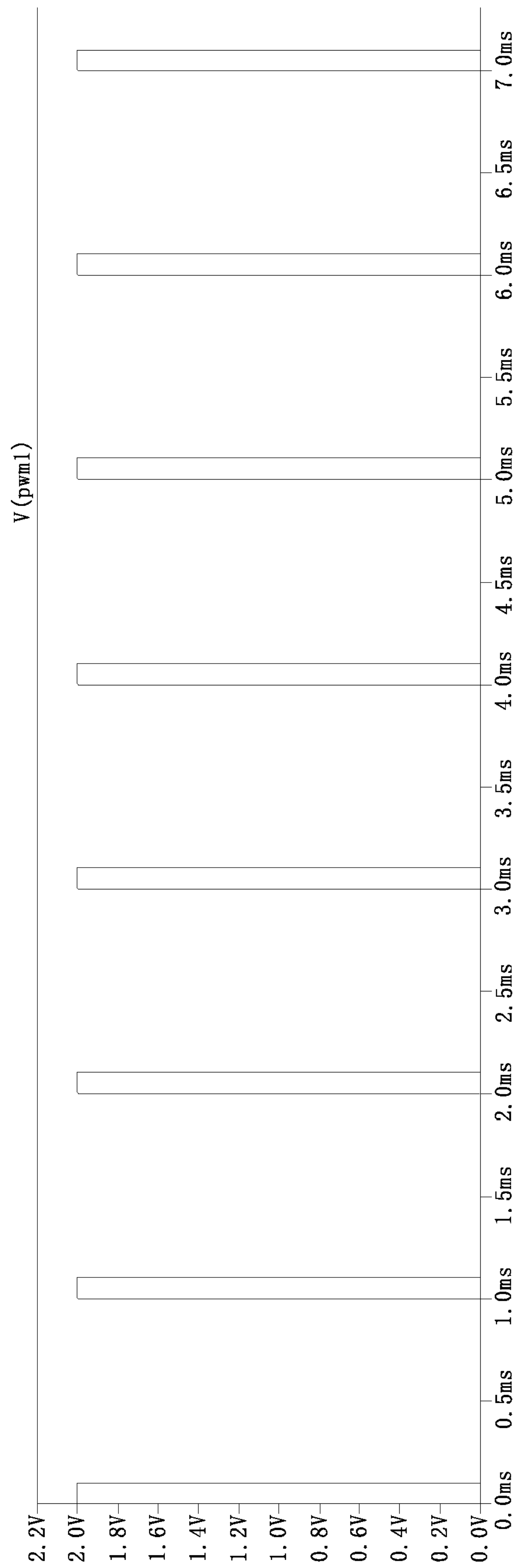
FIG. 28 is a waveform diagram of PWM1 when a voltage of a 0-10 V dimmer is 1V.
Figure 29:
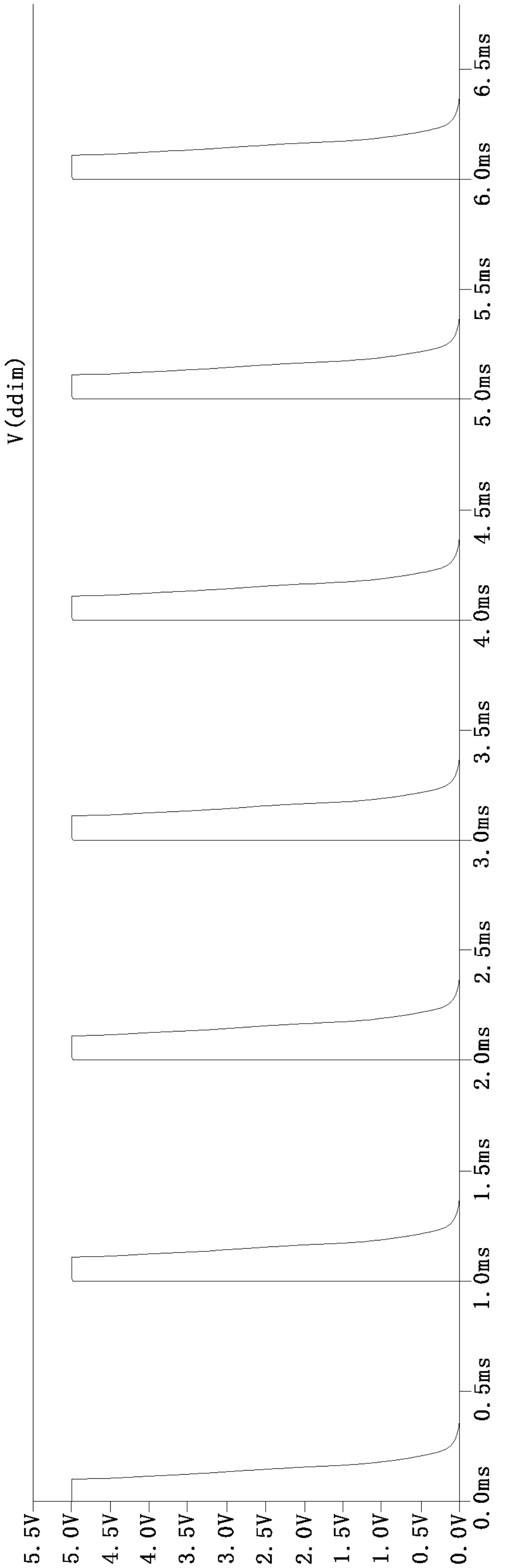
FIG. 29 is a waveform diagram of DDIM when a voltage of a 0-10 V dimmer is 1V.
Figure 30:
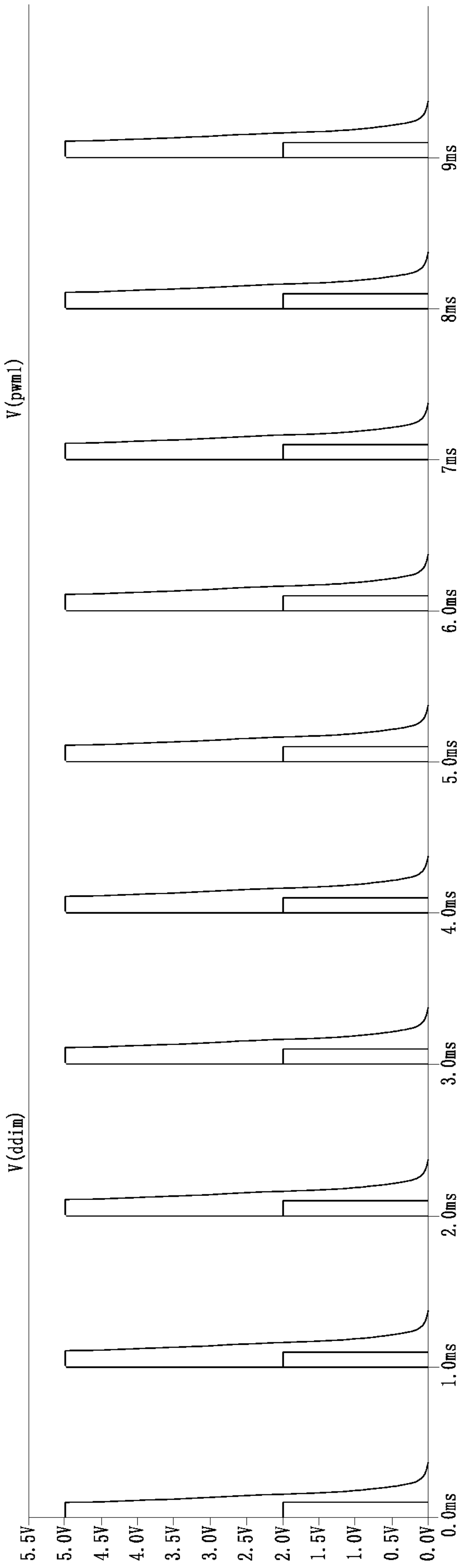
FIG. 30 is a waveform comparison diagram of PWM1 and DDIM when a voltage of a 0-10 V dimmer is 1 V.

When the voltage of the 0-10 V dimmer is 1V, the duty cycle of PWM1 is 10%, and high level value of PWM1 is 2 V, as shown in FIG. 28. The duty cycle of DDIM is 10%, and high level value of DDIM is 5 V, as shown in FIG. 29. The waveform comparison of PWM1 and DDIM is shown in FIG. 30.

In conclusion, the 0-10V dimmer, resistance dimmer and PWM dimmer signals are converted into a DDIM digital PWM signal by a circuit, DDIM controls Q2 to be turned on and off, and VDIM gives the reference voltage of the output current control circuit through Q2. When the 0-10V dimmer signal changes, the duty cycle of DDIM changes, and the reference voltage of the output current control circuit changes, such that the output current changes, and the dimming function of the 0-10 V dimmer is achieved.

The principle of a resistance dimming mode: the DIM pin of U5 has a constant output current of 0.1 mA, and the resistance dimmer is connected between DIM+ and DIM−, with a maximum resistance of 100 K. The dimming curve and dimming principle are the same as the conversion principle of the 0-10 V dimming signal. When the resistance of the resistance dimmer is adjusted to 100 K, the voltage of the DIM pin of U5 is 10 V, and the duty cycle of DDIM is 100%. When the resistance of the resistance dimmer is adjusted to 50 K, the duty cycle of DDIM is 50%. When the resistance of the resistance dimmer is adjusted to 10 K, the duty cycle of DDIM is 10%.

The principle of a PWM dimming mode: the PWM dimmer is connected between DIM+ and DIM−, with a maximum duty cycle of 100%. The dimming curve and dimming principle are the same as the conversion principle of the 0-10 V dimming signal. When the duty cycle of the PWM dimmer is adjusted to 100%, the duty cycle of DDIM is 100%. When the duty cycle of the PWM dimmer is adjusted to 50%, the duty cycle of DDIM is 50%. When the duty cycle of the PWM dimmer is adjusted to 10%, the duty cycle of DDIM is 10%.

When the DIM pin is suspended, and the 0-10 V, resistance and PWM signals do not access, the output duty cycle of PWM1 is 100%.

Figure 31:
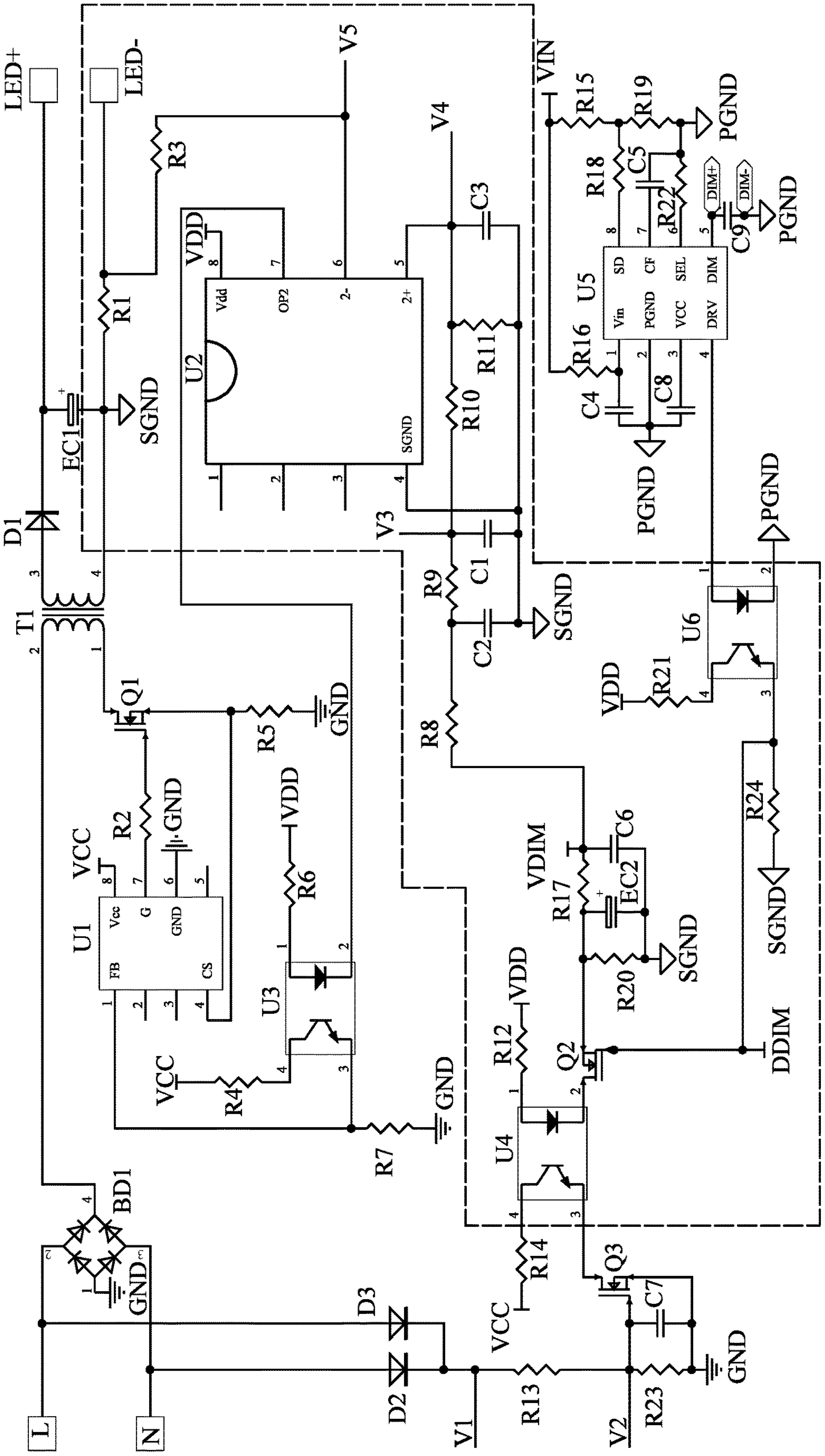
FIG. 31 is a schematic diagram of an output current control circuit.
Figure 32:
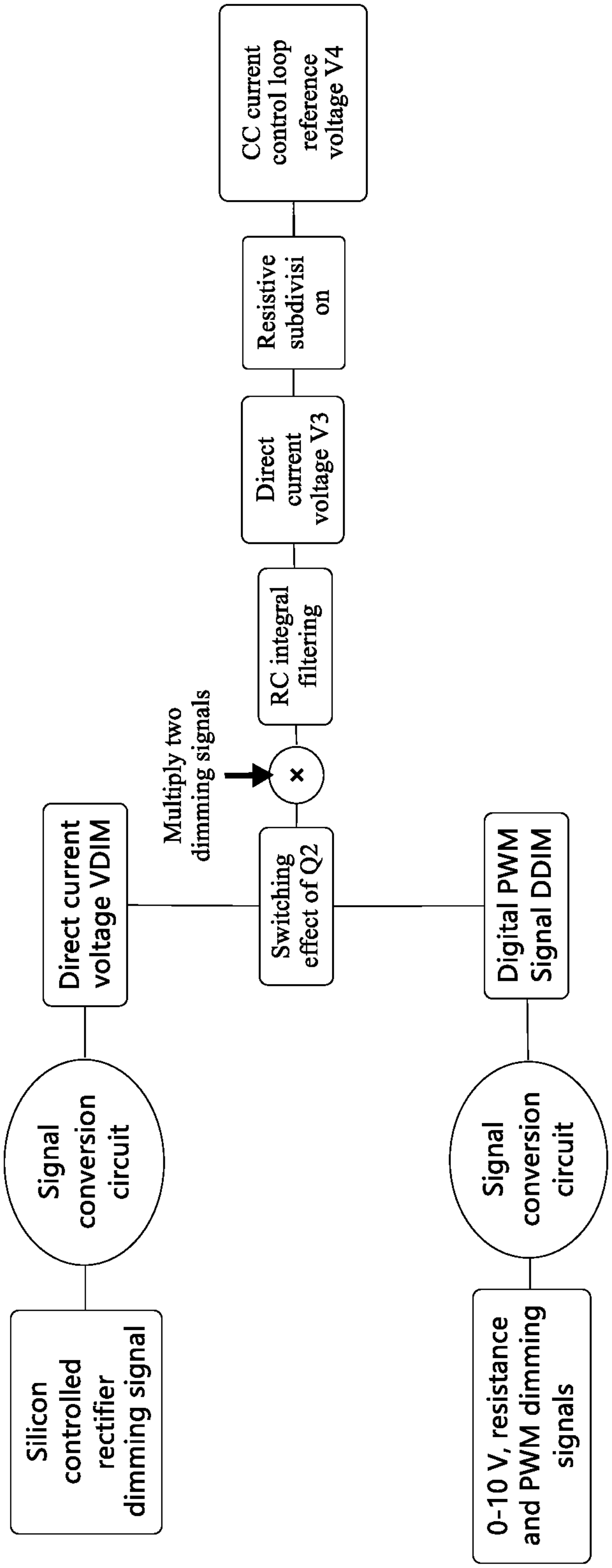
FIG. 32 is a signal conversion logic diagram.

The principle of the output current control circuit is as follows: the schematic diagram of the output current control circuit is shown in the dotted line block diagram of FIG. 31. The silicon controlled rectifier signal conversion circuit generates a VDIM analog voltage signal, the DIM signal conversion circuit generates a digital PWM signal DDIM, DDIM drives Q2, and Q2 is in an on-off state. Under the switching effect of Q2, VDIM is converted into a stable direct current voltage signal V3 through the RC integral filter circuit. V3 is divided by the resistors R10 and R11 and filtered by the capacitor C3 to obtain a CC current loop control reference voltage V4. V4 is a non-inverting input terminal of the operational amplifier, and the signal conversion logic diagram is shown in FIG. 32.

Assuming that the output current is Jo, the current measurement is performed through the resistor R1, the current signal is converted into a voltage signal and then transmitted to the pin 6 of U2 through the resistor R3, namely an inverting input terminal of the dual operational amplifier, and then the detection voltage V5 of the output current is =Io*R1. When the output current is constant at Jo, according to the principle of a dual operational amplifier, the voltages of the non-inverting input terminal and the inverting input terminal of the dual operational amplifier are equal. That is, the reference voltage V4 of the output current control circuit is equal to the output current detection feedback voltage V5, that is, voltage V4=V5. Because V4=V3*R11/(R11+R10), and V5=Io*R1, the output current calculation formula is that Io=V3*R11/[R1*(R11+R10)]. It can be seen from the output current calculation formula that the output current Io is a positive function curve of V3, where R1, R10, and R11 are quantitative values. When the voltage of V3 changes, the power supply output current changes synchronously with V3. When dimming is performed by the silicon controlled rectifier dimmer, the 0-10 V dimmer, the resistance dimmer, and the PWM dimmer, the dimming signal is converted into a direct current voltage of V3 through the signal conversion circuit. In view of the above, when the dimming angle of the silicon controlled rectifier dimmer, the dimming voltage of the 0-10 V dimmer, the resistance of the resistance dimmer, and the PWM duty cycle of the PWM dimmer change, the voltage of V3 changes. Moreover, because Io=V3*R11/[R1*(R11+R10)], the output current Io changes, thereby achieving six-in-one dimming of silicon controlled rectifier, ELV, MLV, 0-10 V, resistance and PWM.

Figure 33:
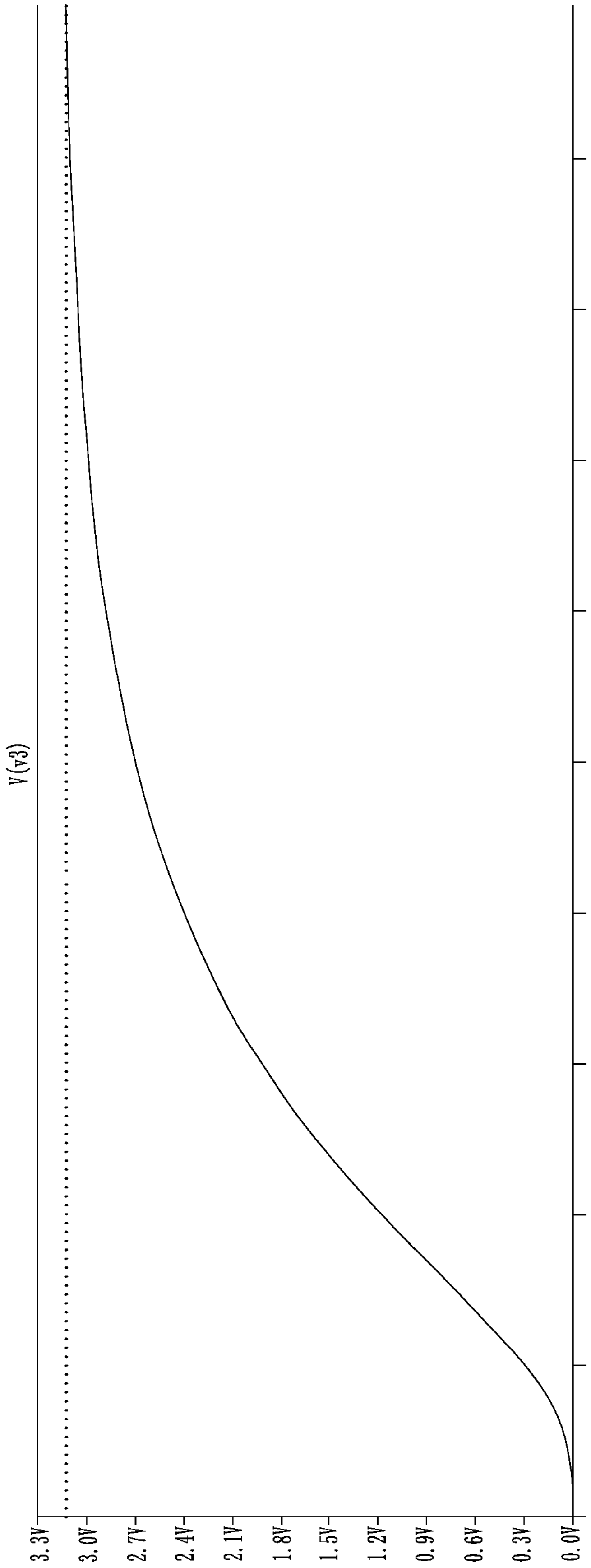
FIG. 33 is a voltage waveform diagram of V3 when a silicon controlled rectifier dimmer is adjusted to an angle of 100% and a DIM pin of U5 is suspended.
Figure 34:
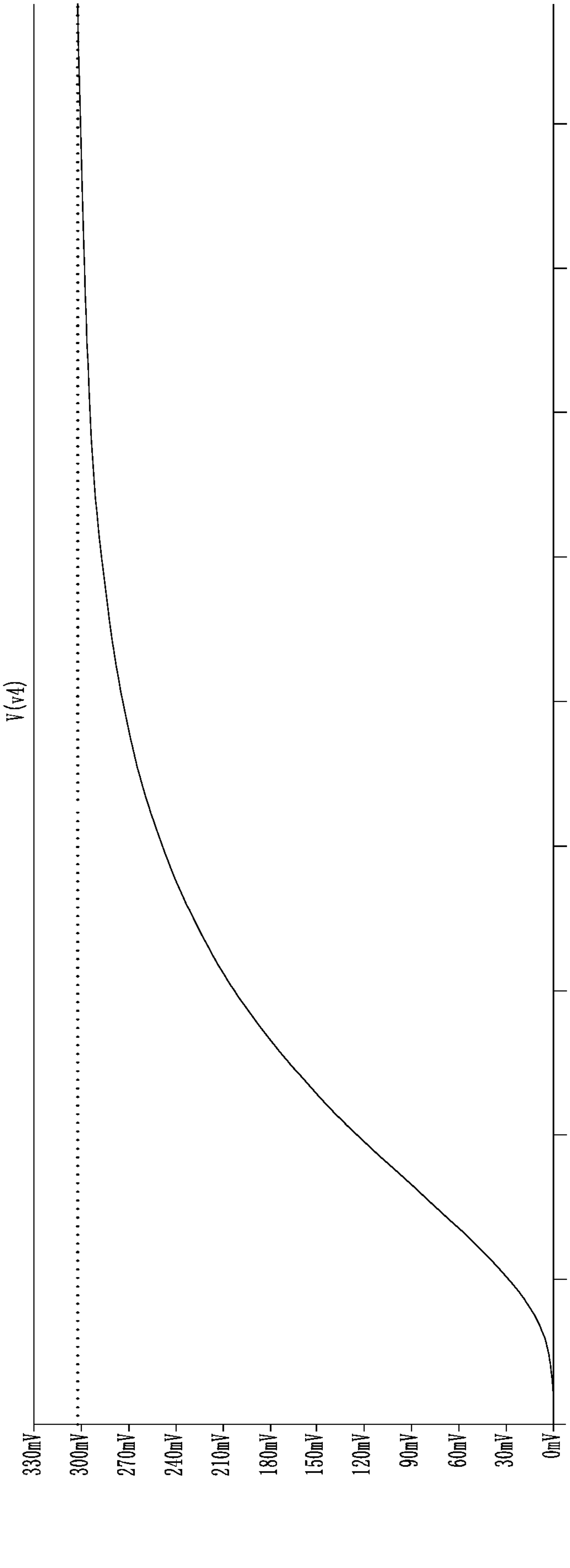
FIG. 34 is a voltage waveform diagram of V4 when a silicon controlled rectifier dimmer is adjusted to an angle of 100% and a DIM pin of U5 is suspended.

When the silicon controlled rectifier dimmer is adjusted to an angle of 100%, the DIM pin of U5 is suspended. That is, when the duty cycle of PWM1 is 100%, the voltage waveform of V3 is shown in FIG. 33, and V3=3.13 V. Assuming that R11=100 K, R10=10.6 K, R1=0.3 R, C3=10 nf, C1=1 uF, C2=1 uF, R8=10 K, and R9=10 K, for the output current control circuit, the reference voltage of U5 is that V4=V3*R11/(R11+R10)=0.3 V, and the output current Io=V3*R11/[R1*(R11+R10)]=1 A. The voltage waveform of V4 is shown in FIG. 34.

Figure 35:
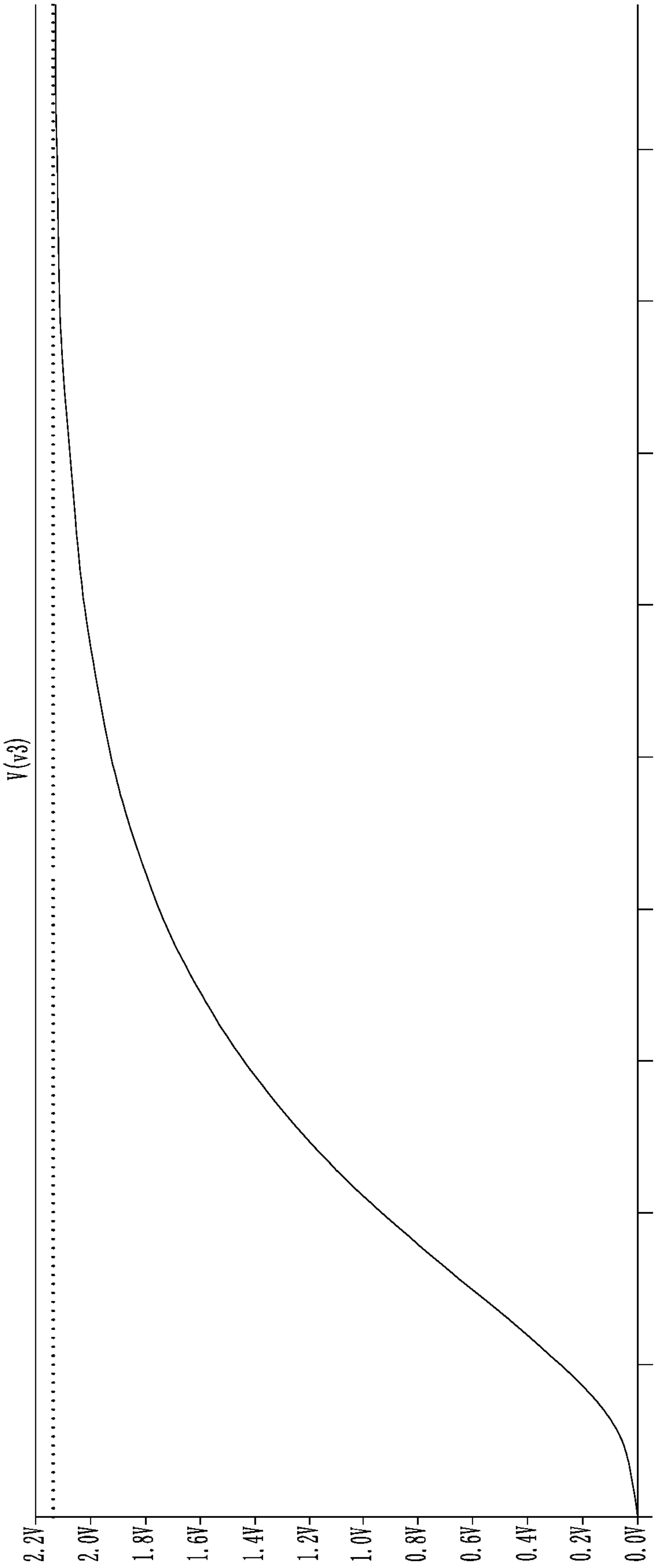
FIG. 35 is a voltage waveform diagram of V3 when a silicon controlled rectifier dimmer is adjusted to an angle of 50% and a DIM pin of U5 is suspended.
Figure 36:
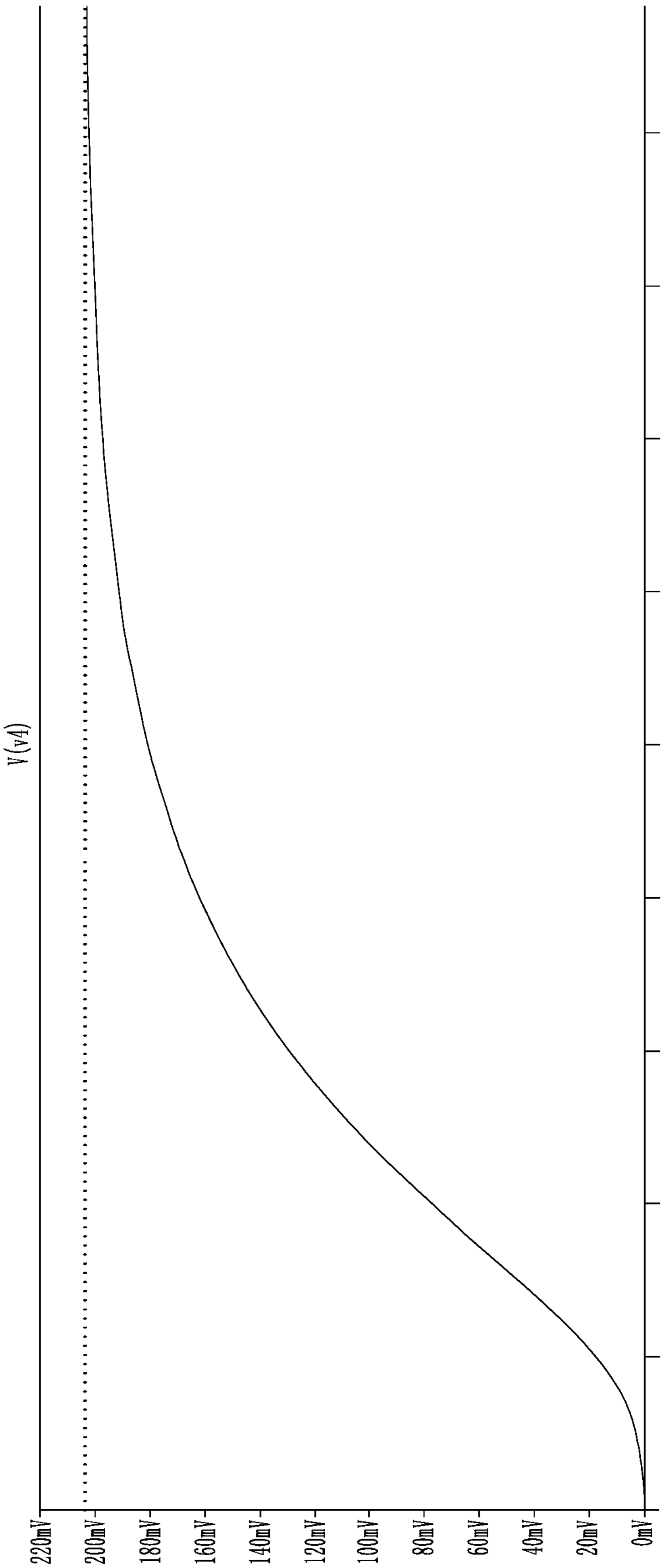
FIG. 36 is a voltage waveform diagram of V4 when a silicon controlled rectifier dimmer is adjusted to an angle of 50% and a DIM pin of U5 is suspended.

When the silicon controlled rectifier dimmer is adjusted to an angle of 50%, the DIM pin of U5 is suspended. That is, when the duty cycle of PWM1 is 100%, the voltage waveform of V3 is shown in FIG. 35, and V3=2.13 V. Assuming that R11=100 K, R10=10.6 K, R1=0.3 R, C3=10 nf, C1=1 uF, C2=1 uF, R8=10 K, and R9=10 K, for the output current control circuit, the reference voltage of U5 is that V4=V3*R11/(R11+R10)=0.204 V, and the output current Io=V3*R11/[R1*(R11+R10)]=0.68 A. The voltage waveform of V4 is shown in FIG. 36.

Figure 37:
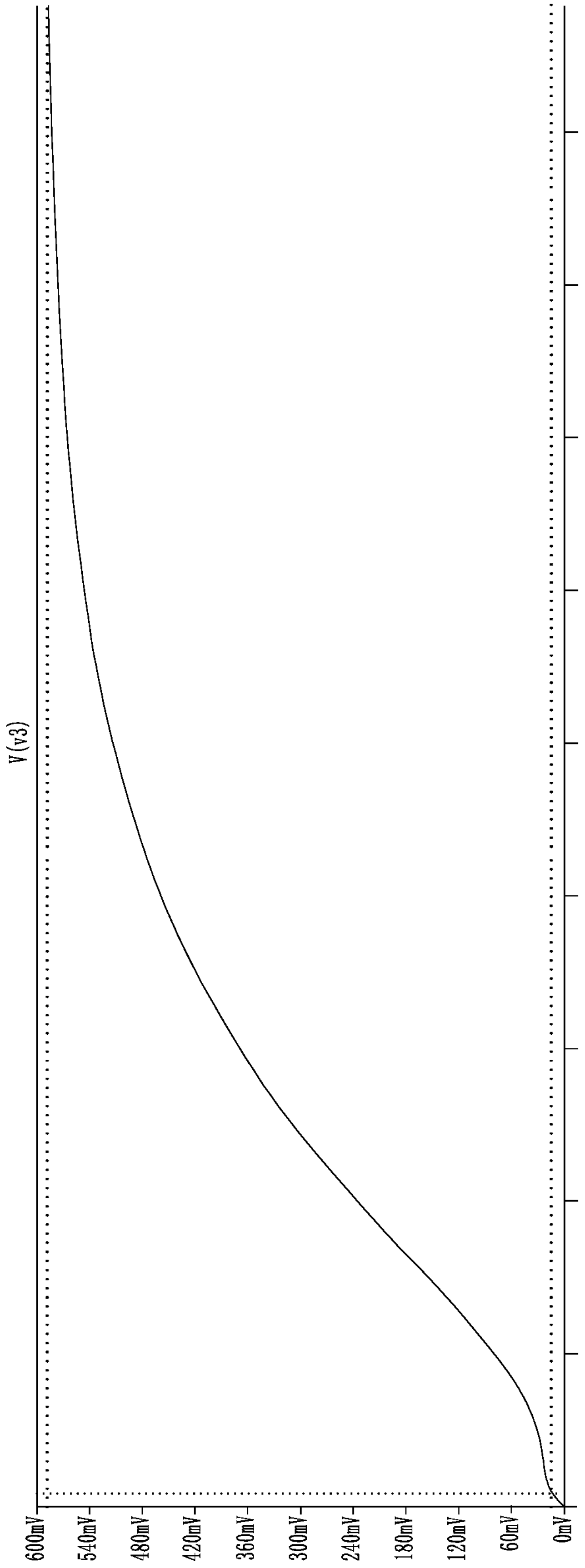
FIG. 37 is a voltage waveform diagram of V3 when a silicon controlled rectifier dimmer is adjusted to an angle of 10% and a DIM pin of U5 is suspended.
Figure 38:
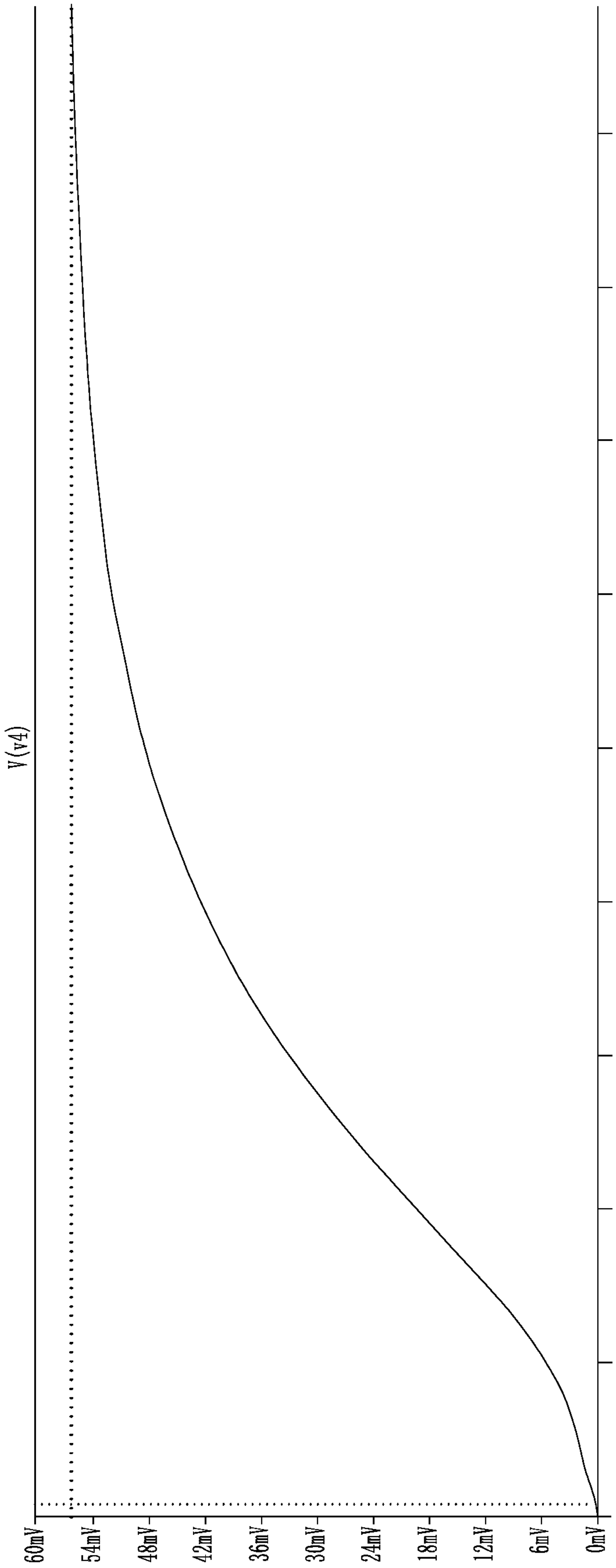
FIG. 38 is a voltage waveform diagram of V4 when a silicon controlled rectifier dimmer is adjusted to an angle of 10% and a DIM pin of U5 is suspended.

When the silicon controlled rectifier dimmer is adjusted to an angle of 10%, the DIM pin of U5 is suspended. That is, when the duty cycle of PWM1 is 100%, the voltage waveform of V3 is shown in FIG. 37, and V3=0.587V. Assuming that R11=100 K, R10=10.6 K, R1=0.3 R, C3=10 nf, C1=1 uF, C2=1 uF, R8=10 K, and R9=10 K, for the output current control circuit, the reference voltage of U5 is that V4=V3*R11/(R11+R10)=0.056 V, and the output current Io=V3*R11/[R1*(R11+R10)]=0.187 A. The voltage waveform of V4 is shown in FIG. 38.

Figure 39:
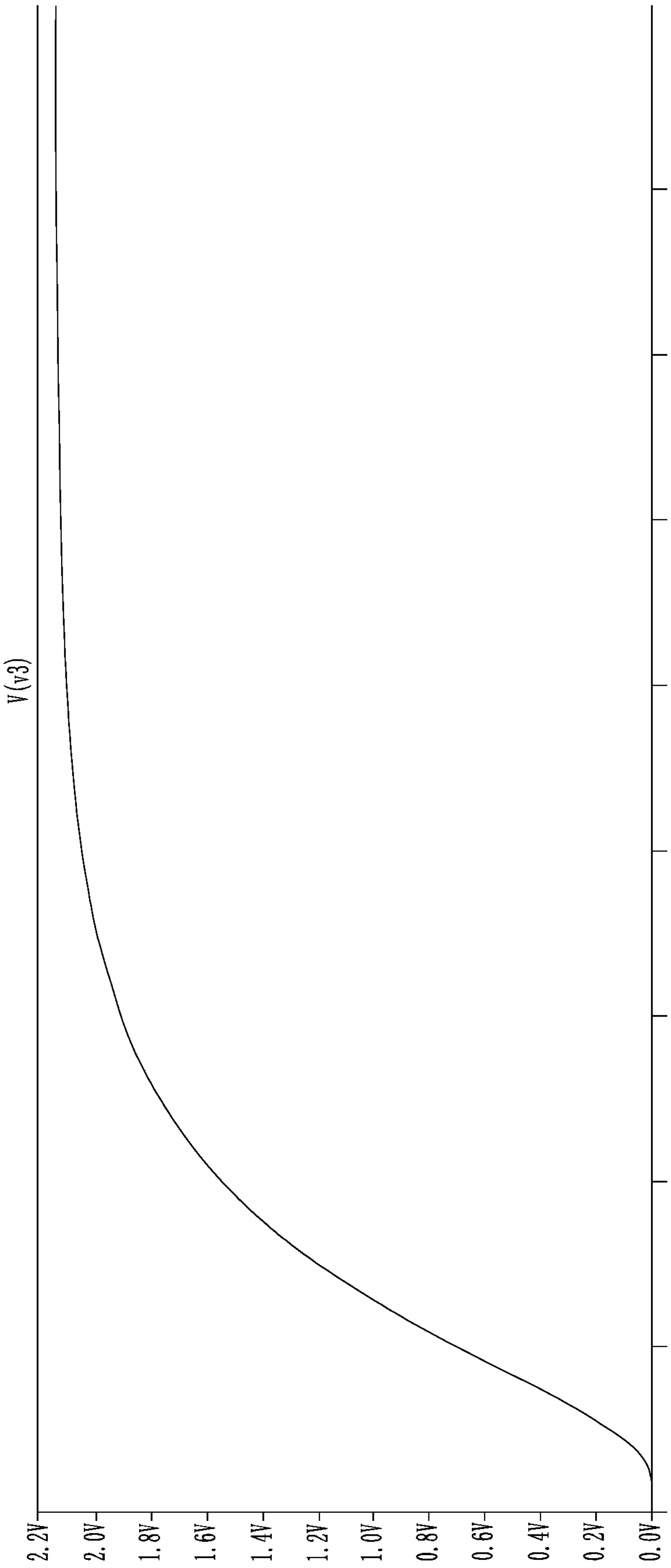
FIG. 39 is a voltage waveform diagram of V3 when a silicon controlled rectifier dimmer is adjusted to an angle of 100% and a dimming voltage of DIM+ and DIM− accessing a 0-10 V dimmer is 5 V.
Figure 40:
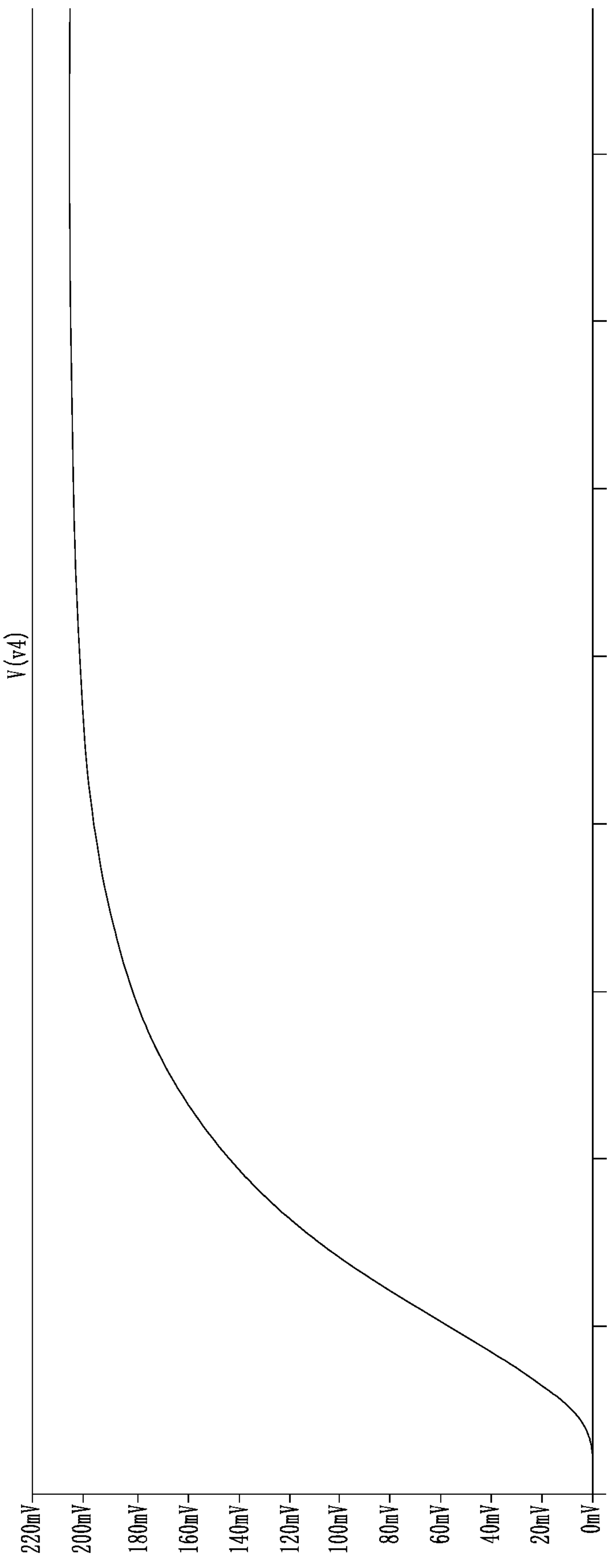
FIG. 40 is a voltage waveform diagram of V4 when a silicon controlled rectifier dimmer is adjusted to an angle of 100% and a dimming voltage of DIM+ and DIM− accessing a 0-10 V dimmer is 5 V.

When the silicon controlled rectifier dimmer is adjusted to an angle of 100%, DIM+ and DIM− access the 0-10 V dimmer. When the dimming voltage is 5 V, that is, when the duty cycle of PWM1 is 50%, the voltage waveform of V3 is shown in FIG. 39, and V3=2.14 V. Assuming that R11=100 K, R10=10.6 K, R1=0.3 R, C3=10 nf, C1=1 uF, C2=1 uF, R8=10 K, and R9=10 K, for the output current control circuit, the reference voltage of U5 is that V4=V3*R11/(R11+R10)=0.205 V, and the output current Io=V3*R11/[R1*(R11+R10)]=0.683 A. The voltage waveform of V4 is shown in FIG. 40.

Figure 41:
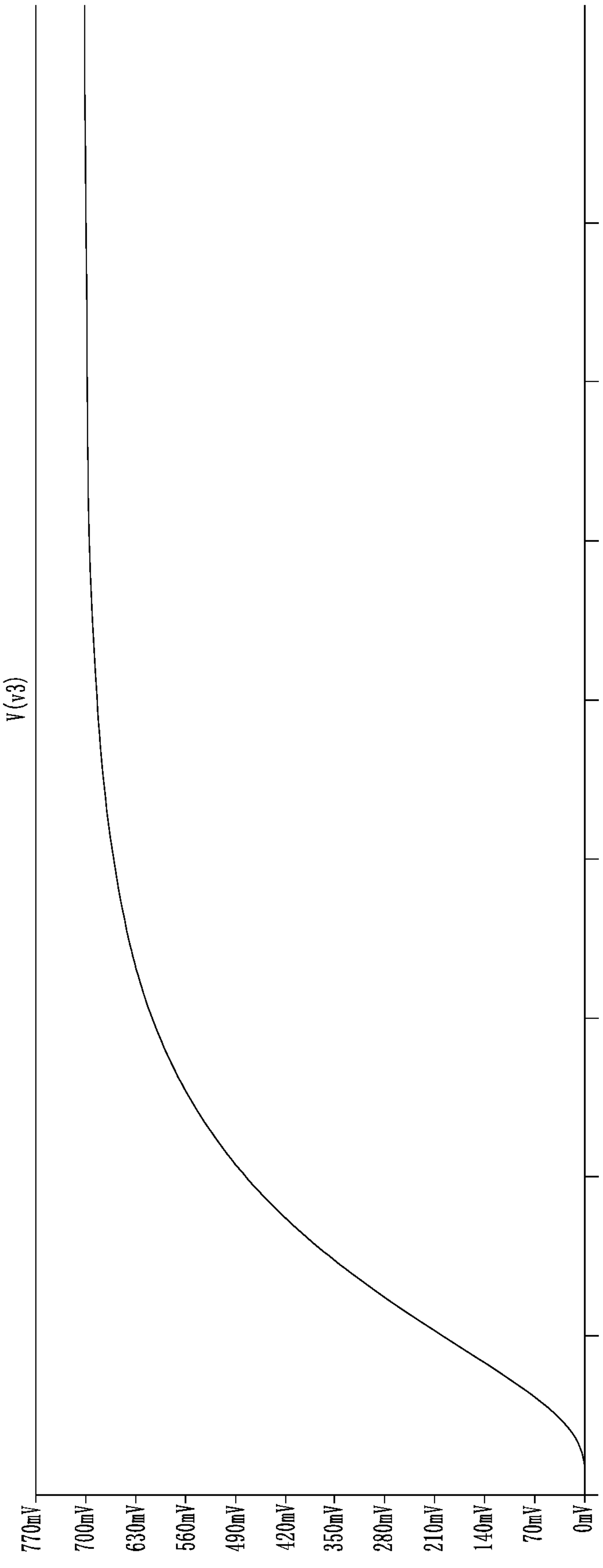
FIG. 41 is a voltage waveform diagram of V3 when a silicon controlled rectifier dimmer is adjusted to an angle of 100% and a dimming voltage of DIM+ and DIM− accessing a 0-10 V dimmer is 1 V.
Figure 42:
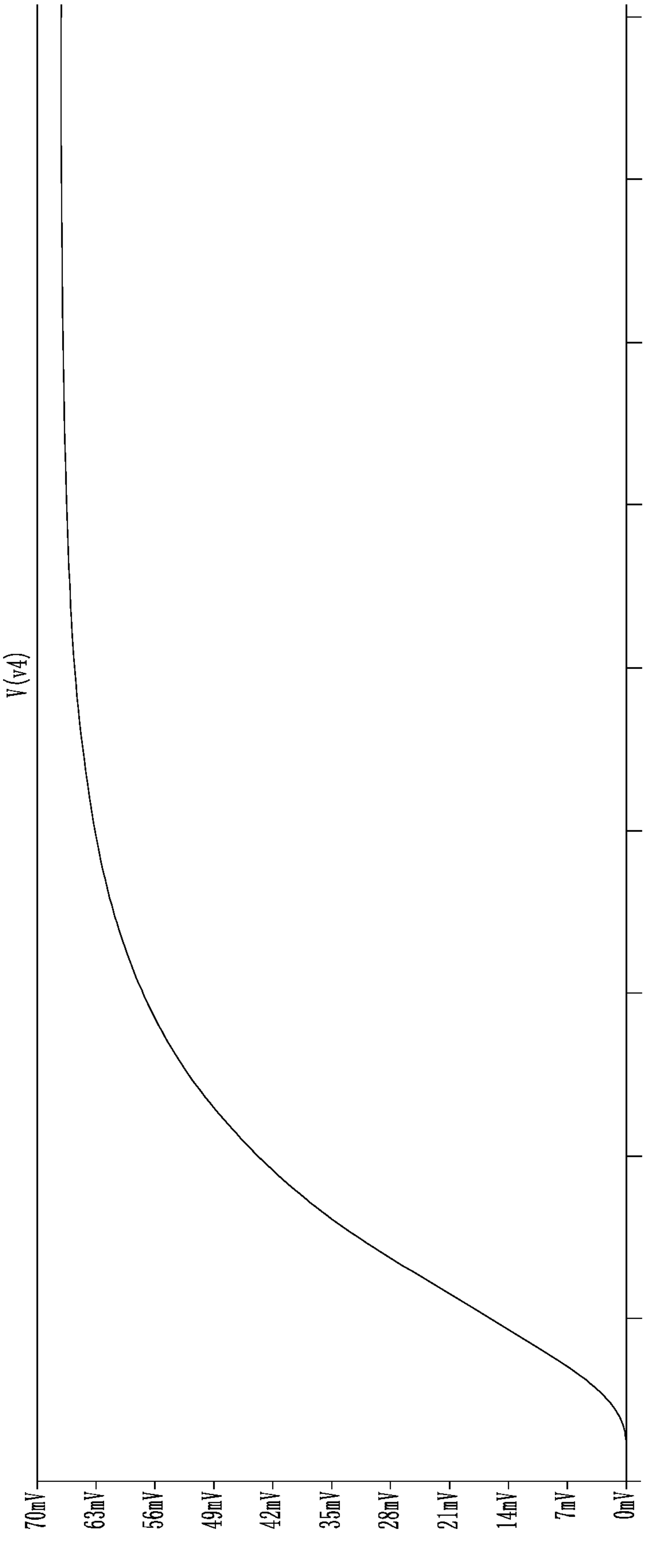
FIG. 42 is a voltage waveform diagram of V4 when a silicon controlled rectifier dimmer is adjusted to an angle of 100% and a dimming voltage of DIM+ and DIM− accessing a 0-10 V dimmer is 1 V.

When the silicon controlled rectifier dimmer is adjusted to an angle of 100%, DIM+ and DIM− access the 0-10 V dimmer. When the dimming voltage is 1V, that is, when the duty cycle of PWM1 is 10%, the voltage waveform of V3 is shown in FIG. 41, and V3=0.7V. Assuming that R11=100 K, R10=10.6 K, R1=0.3 R, C3=10 nf, C1=1 uF, C2=1 uF, R8=10 K, and R9=10 K, for the output current control circuit, the reference voltage of U5 is that V4=V3*R11/(R11+R10)=0.067 V, and the output current Io=V3*R11/[R1*(R11+R10)]=0.224 A. The voltage waveform of V4 is shown in FIG. 42.

Figure 43:
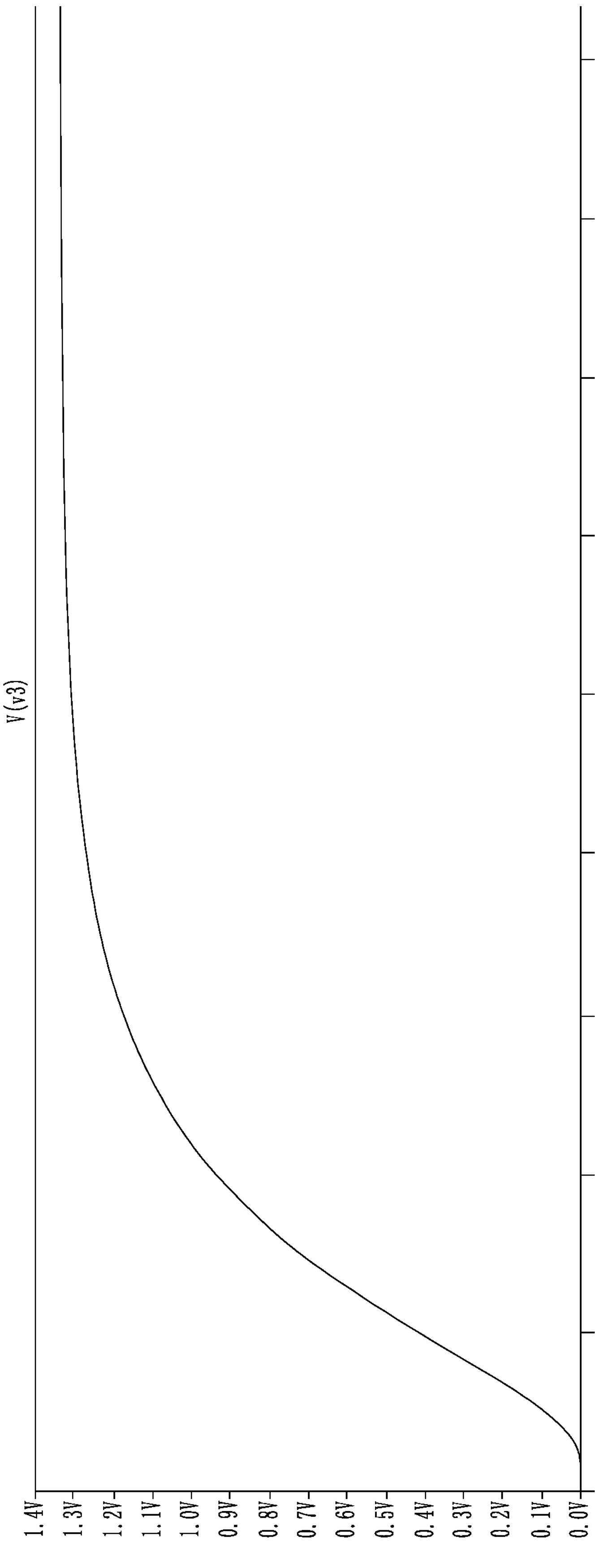
FIG. 43 is a voltage waveform diagram of V3 when a silicon controlled rectifier dimmer is adjusted to an angle of 50% and a dimming voltage of DIM+ and DIM− accessing a 0-10 V dimmer is 5 V.
Figure 44:
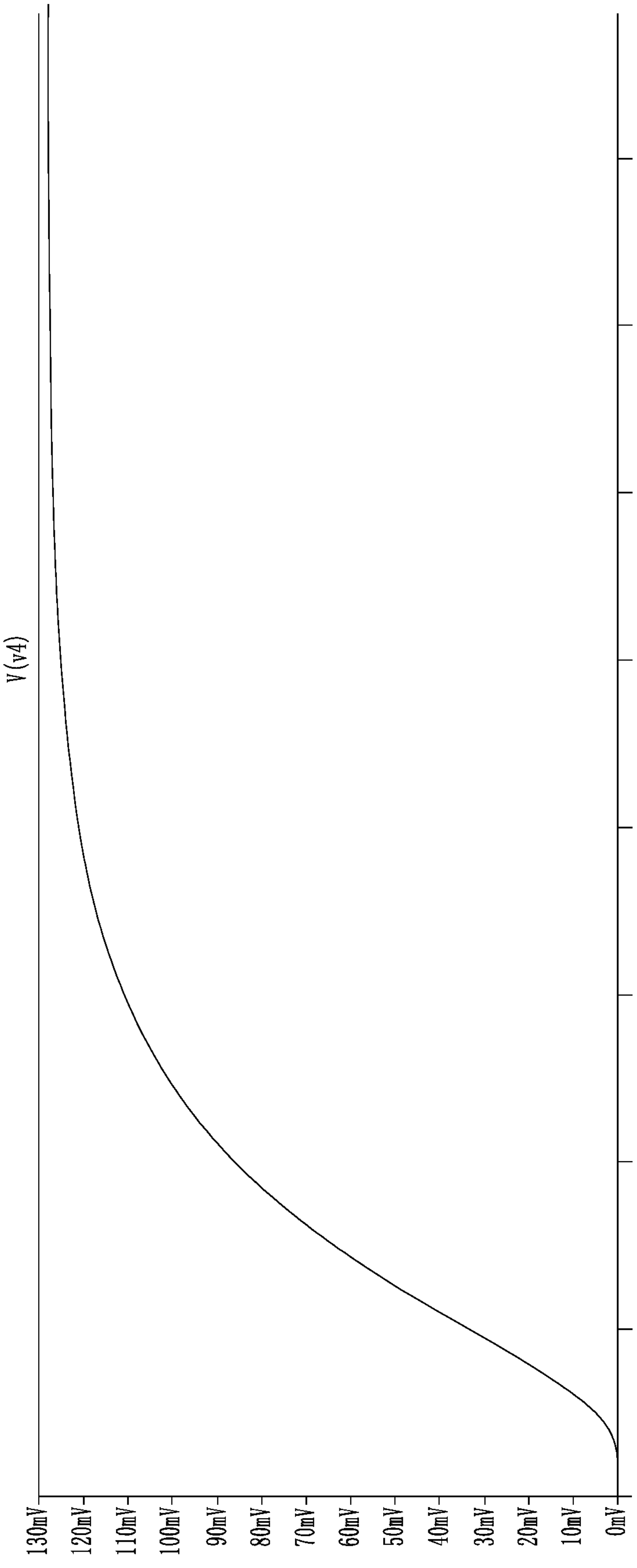
FIG. 44 is a voltage waveform diagram of V4 when a silicon controlled rectifier dimmer is adjusted to an angle of 50% and a dimming voltage of DIM+ and DIM− accessing a 0-10 V dimmer is 5 V.

When the silicon controlled rectifier dimmer is adjusted to an angle of 50%, DIM+ and DIM− access the 0-10 V dimmer. When the dimming voltage is 5 V, that is, when the duty cycle of PWM1 is 50%, the voltage waveform of V3 is shown in FIG. 43, and V3=1.33V. Assuming that R11=100 K, R10=10.6 K, R1=0.3 R, C3=10 nf, C1=1 uF, C2=1 uF, R8=10 K, and R9=10 K, for the output current control circuit, the reference voltage of U5 is that V4=V3*R11/(R11+R10)=0.127 V, and the output current Io=V3*R11/[R1*(R11+R10)]=0.425 A. The voltage waveform of V4 is shown in FIG. 44.

Figure 45:
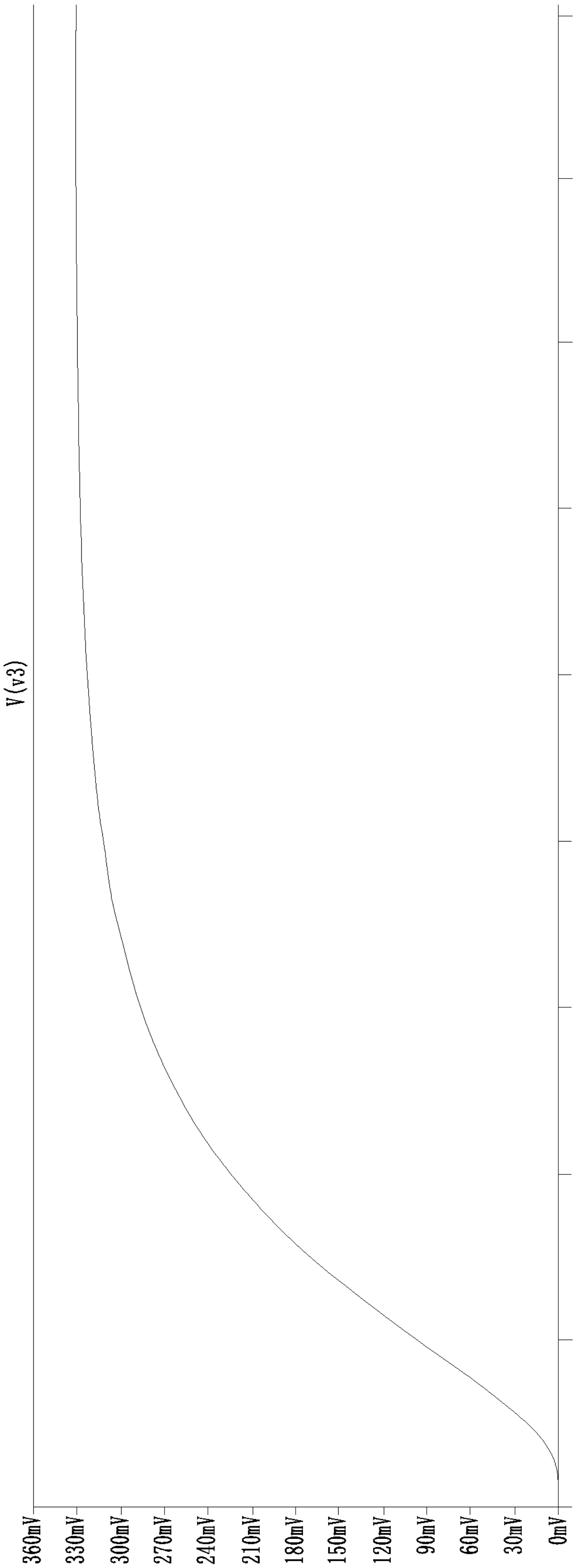
FIG. 45 is a voltage waveform diagram of V3 when a silicon controlled rectifier dimmer is adjusted to an angle of 10% and a dimming voltage of DIM+ and DIM− accessing a 0-10 V dimmer is 5 V.
Figure 46:
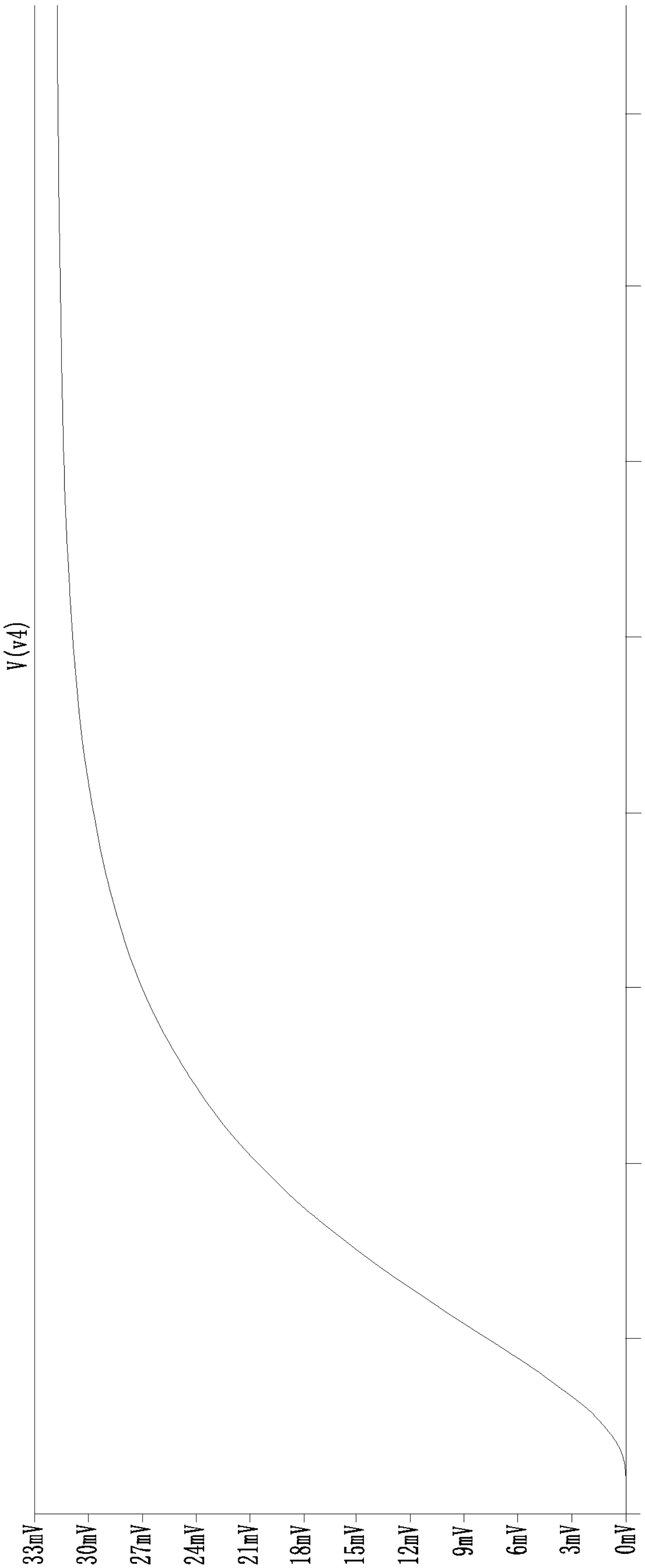
FIG. 46 is a voltage waveform diagram of V4 when a silicon controlled rectifier dimmer is adjusted to an angle of 10% and a dimming voltage of DIM+ and DIM− accessing a 0-10 V dimmer is 5 V.

When the silicon controlled rectifier dimmer is adjusted to an angle of 10%, DIM+ and DIM− access the 0-10 V dimmer. When the dimming voltage is 5 V, that is, when the duty cycle of PWM1 is 50%, the voltage waveform of V3 is shown in FIG. 45, and V3=0.33V. Assuming that R11=100 K, R10=10.6 K, R1=0.3 R, C3=10 nf, C1=1 uF, C2=1 uF, R8=10 K, and R9=10 K, for the output current control circuit, the reference voltage of U5 is that V4=V3*R11/(R11+R10)=0.032 V, and the output current Io=V3*R11/[R1*(R11+R10)]=0.105 A. The voltage waveform of V4 is shown in FIG. 46.

Figure 47:
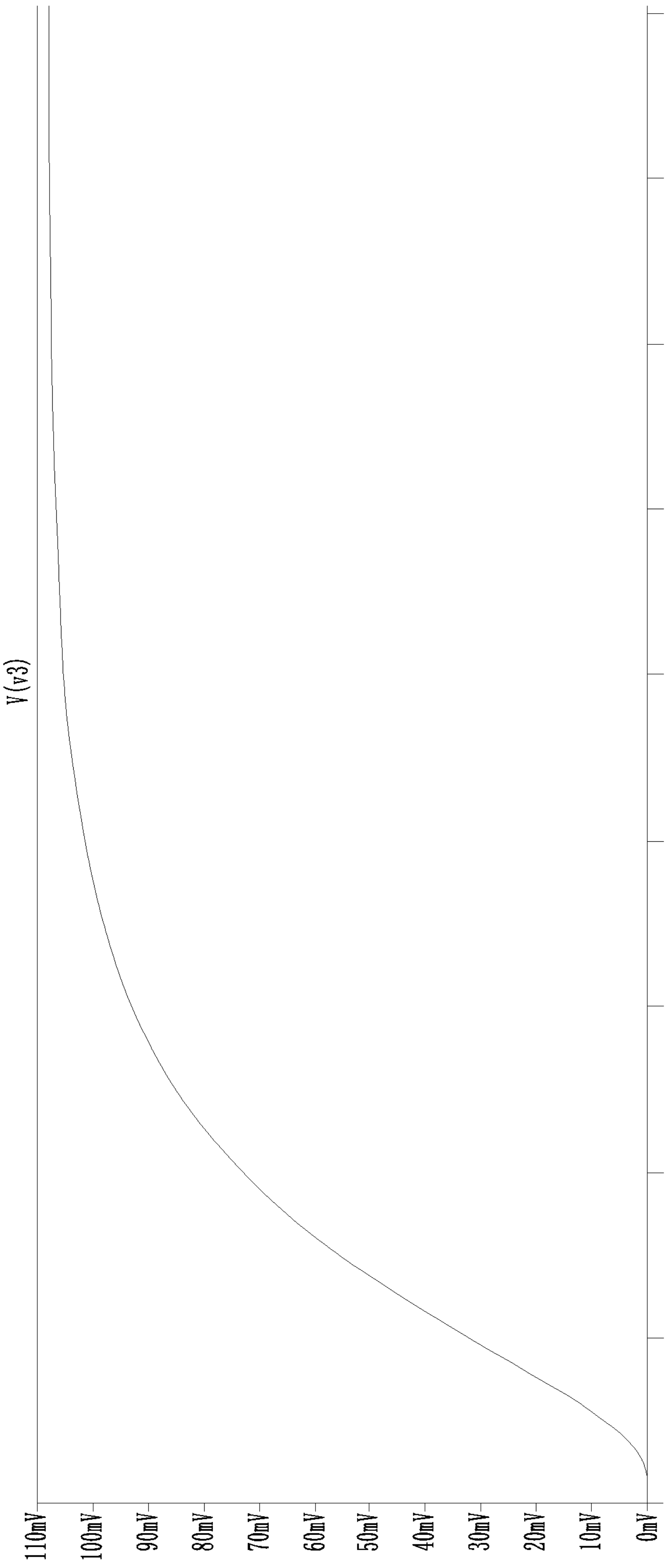
FIG. 47 is a voltage waveform diagram of V3 when a silicon controlled rectifier dimmer is adjusted to an angle of 10% and a dimming voltage of DIM+ and DIM− accessing a 0-10 V dimmer is 1 V.
Figure 48:
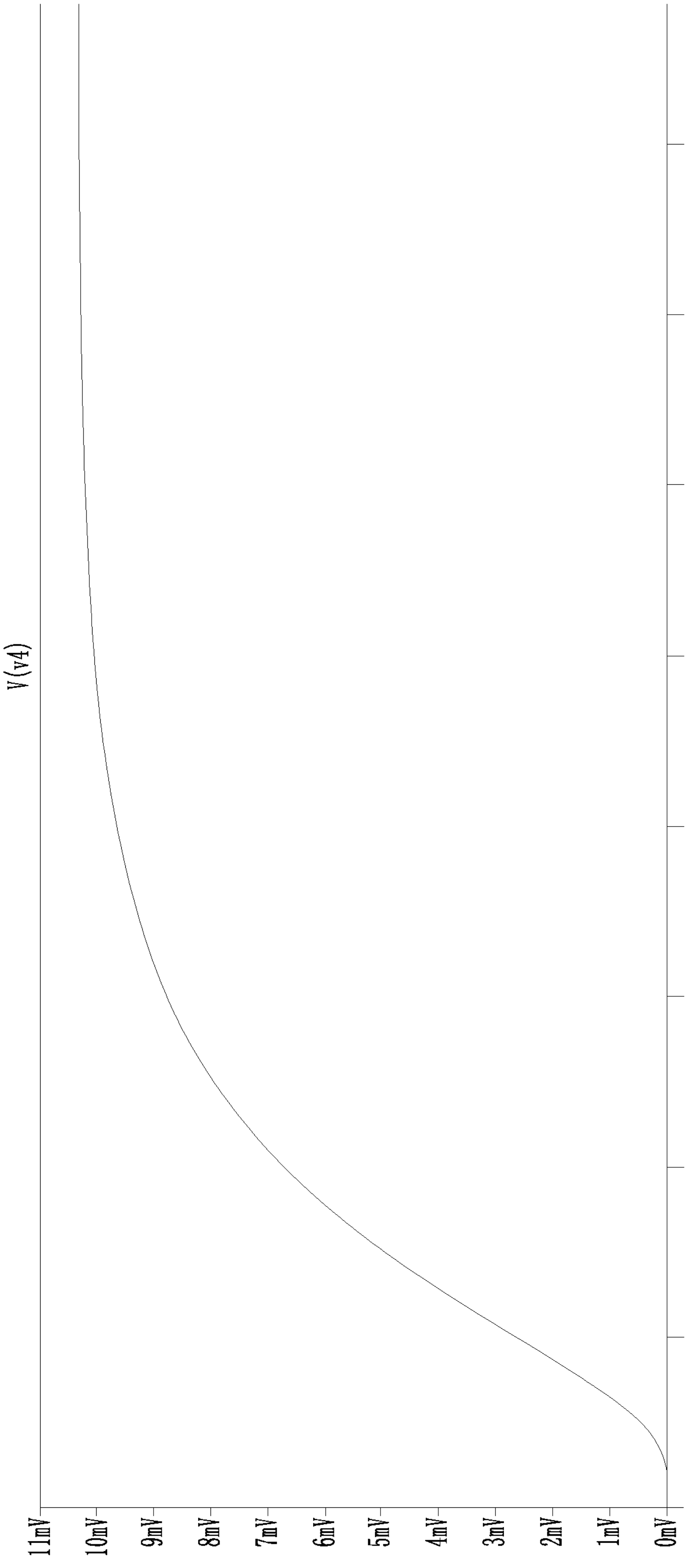
FIG. 48 is a voltage waveform diagram of V4 when a silicon controlled rectifier dimmer is adjusted to an angle of 10% and a dimming voltage of DIM+ and DIM− accessing a 0-10 V dimmer is 1 V.

When the silicon controlled rectifier dimmer is adjusted to an angle of 10%, DIM+ and DIM− access the 0-10 V dimmer. When the dimming voltage is 1V, that is, when the duty cycle of PWM1 is 10%, the voltage waveform of V3 is shown in FIG. 47, and V3=0.107V. Assuming that R11=100 K, R10=10.6 K, R1=0.3 R, C3=10 nf, C1=1 uF, C2=1 uF, R8=10 K, and R9=10 K, for the output current control circuit, the reference voltage of U5 is that V4=V3*R11/(R11+R10)=0.01 V, and the output current Io=V3*R11/[R1*(R11+R10)]=0.034 A. The voltage waveform of V4 is shown in FIG. 48.

When the input alternating current accesses the silicon controlled rectifier dimmer, and DIM+ and DIM− access the resistance dimmer or the PWM dimmer, the adjustment and working principle of the output current are the same as above.

The basic principles, main features, and advantages of the present disclosure are described above. Those skilled in the art should understand that the present disclosure is not limited by the above embodiments, and the descriptions in the above embodiments and specification are merely used for illustrating principles of the present disclosure. The present disclosure may have various modifications and improvements without departing from the spirit and scope of the present disclosure, and all these modifications and improvements should fall within the protection scope of the present disclosure.

What is claimed is:

1. A six-in-one dimming circuit, comprising a main control power circuit, a silicon controlled rectifier signal acquisition circuit, a DIM signal conversion circuit, a silicon controlled rectifier signal conversion circuit, and an output current control circuit, wherein the main control power circuit comprises a live wire and a neutral wire that are connected to a silicon controlled rectifier dimmer or an electronic low-voltage (ELV) dimmer or a magnetic low-voltage (MLV) dimmer, and further comprises a power output positive electrode and a power output negative electrode that are connected to a 0-10 V dimmer or a resistance dimmer or a pulse width modulation (PWM) dimmer; the DIM signal conversion circuit comprises a DIM signal positive input terminal and a DIM signal negative input terminal; a signal acquisition terminal of the silicon controlled rectifier signal acquisition circuit is connected to the live wire and the neutral wire of the main control power circuit; the silicon controlled rectifier signal conversion circuit comprises an input terminal separately connected to an output terminal of the silicon controlled rectifier signal acquisition circuit and an output terminal of the DIM signal conversion circuit, and further comprises an output terminal connected to an input terminal of the output current control circuit; and the output current control circuit comprises an output terminal connected to a feedback signal input terminal of the main control power circuit, and further comprises a voltage signal acquisition terminal connected to the power output negative electrode of the main control power circuit;

the main control power circuit comprises the live wire, the neutral wire, a rectifier bridge, a transformer, a main control chip, a first metal-oxide-semiconductor field effect transistor (MOSFET), a first diode, a first electrolytic capacitor, a first resistor, a second resistor, and a fifth resistor; the rectifier bridge comprises a pin 2 connected to the live wire, a pin 3 connected to the neutral wire, and a pin 4 connected to a pin 2 of the transformer; the transformer comprises a pin 1 connected to a drain of the first MOSFET and a pin 3 connected to an anode of the first diode; a pin 4 of the transformer, a negative electrode of the first electrolytic capacitor, and a first terminal of the first resistor are connected to a signal ground; a cathode of the first diode is connected to a positive electrode of the first electrolytic capacitor and the power output positive electrode, respectively; a second terminal of the first resistor is connected to the power output negative electrode; the second resistor is connected in series between a pin 7 of the main control chip and a gate of the first MOSFET; a pin 4 of the main control chip is connected to a source of the first MOSFET and a first terminal of the fifth resistor, respectively; and a pin 1 of the rectifier bridge, a pin 6 of the main control chip, and a second terminal of the fifth resistor are connected to a power supply ground (GND);

the silicon controlled rectifier signal acquisition circuit comprises a second diode, a third diode, a third MOSFET, a fourth optical coupler, a seventh capacitor, a twelfth resistor, a thirteenth resistor, a fourteenth resistor, and a twenty-third resistor; an anode of the second diode is connected to the neutral wire, and an anode of the third diode is connected to the live wire; a cathode of the second diode is connected to a cathode of the third diode and a first terminal of the thirteenth resistor, respectively; a second terminal of the thirteenth resistor, a first terminal of the twenty-third resistor, a first terminal of the seventh capacitor, and a gate of the third MOSFET are connected; a second terminal of the twenty-third resistor, a second terminal of the seventh capacitor, and a source of the third MOSFET are connected to the power supply ground; the fourth optical coupler comprises a pin 1 connected to a first terminal of the twelfth resistor, a pin 3 connected to a drain of the third MOSFET, and a pin 4 connected to a first terminal of the fourteenth resistor; and a second terminal of the fourteenth resistor is connected to a pin 8 of the main control chip;

the DIM signal conversion circuit comprises a digital signal conversion chip, a sixth optical coupler, a fourth capacitor, a fifth capacitor, an eighth capacitor, a ninth capacitor, a fifteenth resistor, a sixteenth resistor, an eighteenth resistor, a nineteenth resistor, a twenty-first resistor, a twenty-second resistor, and a twenty-fourth resistor; the digital signal conversion chip comprises a pin 1 respectively connected to a first terminal of the sixteenth resistor and a first terminal of the fourth capacitor, a pin 3 connected to a first terminal of the eighth capacitor, and a pin 4 connected to a pin 1 of the sixth optical coupler; a pin 5 of the digital signal conversion chip and a first terminal of the ninth capacitor are connected to the DIM signal positive input terminal; a second terminal of the ninth capacitor is connected to the DIM signal negative input terminal; the digital signal conversion chip further comprises a pin 6 connected to a first terminal of the twenty-second resistor, a pin 7 connected to a first terminal of the fifth capacitor, and a pin 8 connected to a first terminal of the eighteenth resistor; a second terminal of the sixteenth resistor is connected to a first terminal of the fifteenth resistor; a second terminal of the fifteenth resistor is connected to a second terminal of the eighteenth resistor and a first terminal of the nineteenth resistor, respectively; a pin 3 of the sixth optical coupler is connected to a first terminal of the twenty-fourth resistor; a second terminal of the twenty-fourth resistor is connected to the signal ground; a pin 4 of the sixth optical coupler is connected to a first terminal of the twenty-first resistor; and a pin 2 of the digital signal conversion chip, a second terminal of the fourth capacitor, a second terminal of the eighth capacitor, a pin 2 of the sixth optical coupler, a second terminal of the ninth capacitor, a second terminal of the twenty-second resistor, a second terminal of the fifth capacitor, and a second terminal of the nineteenth resistor are connected to a power ground (PGND);

the silicon controlled rectifier signal conversion circuit comprises a second MOSFET, a seventeenth resistor, a twentieth resistor, a second electrolytic capacitor, and a sixth capacitor; the second MOSFET comprises a drain connected to a pin 2 of the fourth optical coupler and a gate connected to the pin 3 of the sixth optical coupler; a source of the second MOSFET is connected to a first terminal of the seventeenth resistor, a first terminal of the twentieth resistor, and an anode of the second electrolytic capacitor, respectively; a second terminal of the seventeenth resistor is connected to a first terminal of the sixth capacitor; and a second terminal of the twentieth resistor, a cathode of the second electrolytic capacitor, and a second terminal of the sixth capacitor are connected to the signal ground; and the output current control circuit comprises a dual operational amplifier, a third optical coupler, a third resistor, a fourth resistor, a sixth resistor, a seventh resistor, an eighth resistor, a ninth resistor, a tenth resistor, an eleventh resistor, a first capacitor, a second capacitor, and a third capacitor; the eighth resistor comprises a first terminal connected to the second terminal of the seventeenth resistor and a second terminal connected to a first terminal of the ninth resistor and a first terminal of the second capacitor, respectively; a second terminal of the ninth resistor is connected to a first terminal of the first capacitor and a first terminal of the tenth resistor, respectively; a second terminal of the tenth resistor is connected to a first terminal of the eleventh resistor, a first terminal of the third capacitor, and a pin 5 of the dual operational amplifier, respectively; a first terminal of the third resistor is connected to a second terminal of the first resistor; the dual operational amplifier comprises a pin 6 connected to a second terminal of the third resistor and a pin 7 connected to a pin 2 of the third optical coupler; the third optical coupler comprises a pin 1 connected to a first terminal of the sixth resistor, a pin 3 respectively connected to a first terminal of the seventh resistor and a pin 1 of the main control chip, and a pin 4 connected to a first terminal of the fourth resistor; a second terminal of the fourth resistor is connected to a pin 8 of the main control chip; a second terminal of the seventh resistor is connected to the power supply ground; a pin 8 of the dual operational amplifier is respectively connected to a second terminal of the sixth resistor, a second terminal of the twelfth resistor, and a second terminal of the twenty-first resistor; and a pin 4 of the dual operational amplifier, a second terminal of the first capacitor, a second terminal of the second capacitor, a second terminal of the third capacitor, and a second terminal of the eleventh resistor are connected to the signal ground (SGND).

* * * * *